United States Patent [19]

Kawaguchi et al.

[11] 4,242,208
[45] Dec. 30, 1980

[54] SEMIPERMEABLE COMPOSITE MEMBRANE AND PROCESS FOR PREPARATION THEREOF

[75] Inventors: Takeyuki Kawaguchi; Yutaka Taketani; Hiroyoshi Minematsu; Noriaki Sasaki; Yuzuru Hayashi; Shigeyoshi Hara, all of Iwakuni, Japan

[73] Assignee: Teijin Limited, Osaka, Japan

[21] Appl. No.: 39,559

[22] Filed: May 16, 1979

[30] Foreign Application Priority Data

May 22, 1978 [JP] Japan .................. 53-59881

[51] Int. Cl.³ ............ B01D 39/00; B01D 13/00; B05D 5/00; C08C 19/22
[52] U.S. Cl. .................. 210/500.2; 210/654; 427/246; 521/63
[58] Field of Search .......... 210/22, 23 H, 321, 500 M, 210/490; 526/31, 46; 428/304; 427/244–246; 55/16, 158

[56] References Cited

U.S. PATENT DOCUMENTS

| | | | |
|---|---|---|---|
| 3,133,132 | 5/1964 | Loeb et al. | 264/49 |
| 3,133,137 | 5/1964 | Loeb et al. | 264/49 |
| 3,951,815 | 4/1976 | Wrasidlo | 210/500 M |
| 4,005,012 | 1/1977 | Wrasidlo | 210/500 M |
| 4,039,440 | 8/1977 | Cadotte | 210/500 M |

FOREIGN PATENT DOCUMENTS 51-6883   1/1976   Japan .

Primary Examiner—Charles N. Hart
Assistant Examiner—E. Rollins Cross
Attorney, Agent, or Firm—Wenderoth, Lind & Ponack

[57] ABSTRACT

A semipermeable composite membrane comprising a thin semipermeable film of a polymeric material deposited on one side of the microporous substrate, said polymeric material being prepared by interfacial crosslinking of a polymer containing a recurring unit of the formula

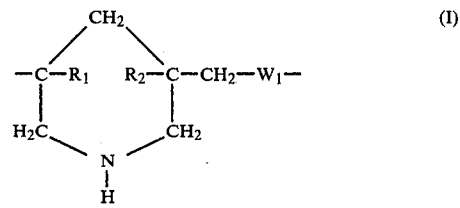

wherein each of $R_1$ and $R_2$ represents a hydrogen atom or a methyl group, and $W_1$ represents a direct bonding or a sulfonyl group ($-SO_2-$), with a polyfunctional compound containing at least two functional groups selected from acid halide, sulfonyl halide, isocyanate, N-haloformyl, haloformate and acid anhydride groups; and a process for producing the same. The semipermeable composite membrane of this invention is especially useful for desalination of saline or brackish water by reverse osmosis.

42 Claims, No Drawings

SEMIPERMEABLE COMPOSITE MEMBRANE AND PROCESS FOR PREPARATION THEREOF

FIELD OF INVENTION

This invention relates to a novel semipermeable composite membrane. More specifically, the invention is concerned with a novel semipermeable composite membrane having high performance in selective permeability characteristics such as water flux and salt rejection, chemical resistances such as oxidation resistance, acid resistance and alkali resistance, and thermal stability, a process for production thereof, and with the use of the aforesaid membrane in reverse osmosis.

DESCRIPTION OF PRIOR ART

The semipermeable membrane is a membrane which has selective permeability to specified molecules. It is frequently used to remove very small amounts of contaminated molecules dissolved or diffused in a liquid or gas.

In recent years, reverse osmosis has attracted a great deal of interest for utilization in fields involving purification of liquids. This is of especial importance when utilizing this system in the purification of water, including brackish water. Likewise, the process is also used to remove impurities from liquids such as water or, in the fields of dialysis, blood. When utilizing reverse osmosis in the purification of a brackish water, a pressure in excess of the osmotic pressure of the brackish water feed solution is applied to the solution which is prepared from purified water by a semipermeable membrane. Pure water thereby diffuses through the membrane while the sodium chloride molecules or other impurities which may be present in the water are retained by the membrane.

The efficiency of the reverse osmosis method is greatly affected by the properties of the semipermeable membrane used. Much effort has therefore been made to develop membranes having high performance, and has resulted in some specific suggestions.

For example, U.S. Pat. Nos. 3,133,132 and 3,133,137 disclose the early Loeb-type membranes made of cellulose diacetate. These membranes are asymmetric membranes which are characterized by a very thin, dense surface layer or skin that is supported upon an integrally attached, much thicker supporting layer. These known membranes based on cellulose diacetate have the defect of poor compaction, low resistance to chemical and biological degradation, a short useful life, and insufficient flux and salt rejection characteristics.

In an attempt to overcome these defects of the Loeb-type membranes, some membranes composed basically of synthetic polymers have recently been suggested. For example, U.S. Pat. No. 3,951,815 discloses a composite semipermeable membrane comprising a microporous substrate and an ultrathin film formed of a cross-linked, grafted polyethylenimine disposed on one surface of said microporous substrate that has been cross-linked with a di- or tri-functional compound such as isophthaloyl chloride and grafted with a graft reactant such as acrylonitrile or epichlorohydrin. U.S. Pat. No. 4,005,012 describes a composite semipermeable membrane comprising an ultrathin film formed by contacting an amine-modified polyepihalohydrin with a polyfunctional agent on a microporous substrate to form this film on one surface of the microporous substrate. Also, U.S. Pat. No. 4,039,440 discloses a reverse osmosis membrane prepared in situ on a porous support by initial formation of a layer of polyethylenimine on the support, followed by interfacial reaction with a polyfunctional reagent to produce a thin surface coating which possesses salt barrier characteristics.

The membrane composed basically of crosslinked polyethylenimine disclosed in U.S. Pat. No. 4,039,440 has a high salt rejection, but has the defect of insufficient water flux and low oxidation resistance (e.g., low resistance to deterioration by the presence of chlorine in the feed saline or brackish water). As one method of improving the oxidation resistance, U.S. Pat. No. 3,951,815 suggests the grafting of acrylonitrile to the polyethylenimine. The acrylonitrile grafted and cross-linked polyethylenimine shows some improvement in oxidation resistance, but as the membrane is operated continuously during a long period of time, its degradation advances gradually. Moreover, it suffers from the serious defect of markedly reduced water flux.

The membrane composed basically of the amine-modified polyepihalohydrin disclosed in U.S. Pat. No. 4,005,012 exhibits a high salt rejection but its water flux is not sufficient. It has been strongly desired to develop membranes having a higher water flux.

The characteristics required of semipermeable membranes are basically high permselectivity and a high flux. In addition, they should have high resistance to compaction, superior resistance to chemical and biological degradation, and sufficient flexibility to endure shaping into modules in actual use such as a tube, spiral or hollow filament. The membranes so far suggested lack one or more of these characteristics, and are not entirely satisfactory for use as semipermeable membranes.

Japanese Laid-Open Patent Publication No. 6883/76 discloses a method for producing a charged membrane by impregnating a porous substrate composed of a synthetic polymer with a solution of a polyamine or polyaminesulfone, and then drying the applied solution. The polyamine or polyaminesulfone disclosed in this Patent Publication contains a piperidine ring, but differs structurally from the polymers used in the present invention. Moreover, the Japanese Patent Publication gives no disclosure about the use of such a membrane in reverse osmosis. In reverse osmosis, the charged membrane disclosed in the Japanese Publication would show a low salt rejection and low resistance to oxidative attack, and would be virtually useless.

Accordingly, the art has strongly desired to develop membranes having a combination of the aforesaid desired characteristics.

SUMMARY OF THE INVENTION

It is an object of this invention to provide a semipermeable membrane which is free from the defects of conventional reverse osmosis membranes.

Another object of this invention is to provide a semipermeable composite membrane having high permselectivity and flux, superior flexibility, high resistance to compaction, and high resistance to chemical and biological degradation, especially high permselectivity and/or superior resistance to oxidation.

Still another object of this invention is to provide a process for producing a semipermeable composite membrane having high permselectivity and flux, superior flexibility, high resistance to compaction, and high resistance to chemical and biological degradation.

A further object of this invention is to provide a method for using the aforesaid semipermeable composite membrane for the reverse osmosis desalination of a saline or brackish water.

Other objects and advantages of this invention will become apparent from the following description.

According to this invention, there is provided a semipermeable composite membrane comprising a microporous substrate and a thin semipermeable film of a polymeric material deposited on one side of the substrate, said thin semipermeable film being prepared by interfacially cross-linking a polymer containing a recurring unit of the formula

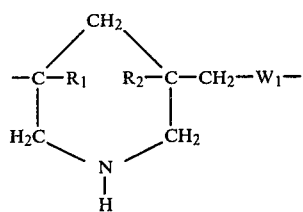

wherein each of $R_1$ and $R_2$ represents a hydrogen atom or a methyl group, and $W_1$ represents either a direct bonding or a sulfonyl group (—$SO_2$—), with a polyfunctional compound containing at least two functional groups from acid halide, sulfonyl halide, isocyanate, N-haloformyl, haloformate and acid anhydride groups.

The characteristic feature of the present invention lies in the use of a specified polymeric material derived from a polymer containing a particular piperidine ring of formula (I) given hereinabove, which has not been used in the art as a material for semipermeable membranes. In such piperidine ring-containing polymers, the nitrogen atom of the piperidine ring is a secondary nitrogen atom. Thus, when this polymer is crosslinked with the polyfunctional compound (to be referred to as a "crosslinking agent") having functional groups selected from acid halide, sulfonyl halide, N-haloformyl, haloformate and acid anhydride groups, the secondary nitrogen atom changes to a nitrogen atom of the tertiary amide type

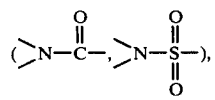

urea type

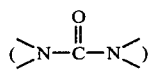

or urethane type

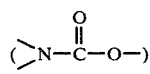

which is stable to oxidation, and thus forms a crosslinking site having superior chemical stability such as oxidation resistance, simultaneously giving superior basic performances in reverse osmosis.

When an isocyanato-containing compound is used as the crosslinking agent, a urea linkage

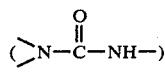

having both a secondary nitrogen atom and a tertiary nitrogen atom results. Hence, its contribution to the increase of oxidation resistance is slightly inferior to the case of using other crosslinking agents. However, the two basic properties, i.e. water permeability and salt rejecting characteristic, required of a reverse osmosis membrane, can be markedly improved.

DETAILED DESCRIPTION OF THE INVENTION

The essential feature of the present invention is the use of a polymer containing a recurring unit having a piperidine ring structure of the formula

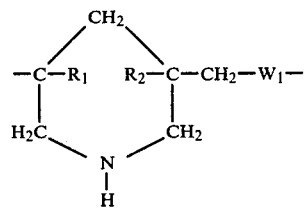

as a raw material for the semipermeable membrane.

In the above formula (I), substituents $R_1$ and $R_2$ may independently represent a hydrogen atom or a methyl group, but are preferably hydrogen atom. $W_1$ represents a direct bonding or a sulfonyl group (—$SO_2$—).

The piperidine ring-containing polymer used in this invention may contain at least 50 mole%, preferably at least 60 mole%, more preferably at least 70 mole%, of a recurring unit having the piperidine ring structure of formula (I). Those which are substantially linear are suitable. In the present invention, polymers composed substantially only of the recurring units of formula (I), and copolymers composed of the recurring unit of formula (I) and another monomeric unit copolymerizable with the unit of formula (I) can both be used so long as they contain the recurring unit of formula (I) in the molar proportions specified above.

The other monomeric units copolymerizable with the recurring unit of formula (I) in the piperidine ring-containing polymer are described hereinbelow. Typical examples are given below.

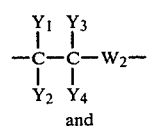

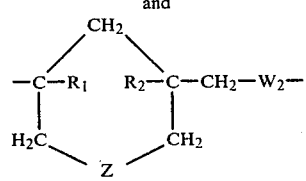

wherein $R_1$ and $R_2$ are defined hereinabove, and the definitions of $Y_1$, $Y_2$, $Y_3$, $Y_4$, Z and $W_2$ are described hereinbelow.

The molar percentage of the recurring unit of formula (I) in the present specification and the appended claims is calculated by assuming that each recurring unit of formula (I), ($\alpha$) or ($\beta$) forms one molar unit, irrespective of the form of monomers used to produce these recurring units.

In the present invention, the unit of formula (I) is contained in the molecular chain of polymer in an amount of at least 50 mole%. Preferably, the units of formula (I) are distributed as uniform as possible in the polymer chain. From this viewpoint, it is preferred that the number of carbon atoms constituting the shortest bonding chain connecting two units of formula (I) closest to each other should be 0 to 20, especially 0 to 12, above all 0 to 6.

The polymer used in this invention should very desirably a soluble polymer which dissolves to some extent in water or water-miscible polar organic solvents in an amount of at least 0.1 g, preferably at least 0.5 g, more preferably at least 1.0 g, at 25° C. per 100 g of water or the organic solvent.

The dissolving of the polymer means not only the case in which the polymer completely dissolves in molecular form in a given solvent to form a true solution, but also the case in which it is dispersed in the form of colloid, latex or emulsion and can be coated on a microporous substrate to be described, thereby forming a coating thereon.

Typical examples of the water-miscible polar organic solvent used to determine the solubility of the polymer include lower alcohols such as methanol, ethanol, n-propanol and iso-propanol, formic acid, dimethylformamide (DMF), dimethylsulfoxide (DMSO), tetramethylenesulfone, and N-methylpyrrolidone (NMP). These organic solvents may contain up to about 10% by weight of water.

The polymer used in this invention is not strictly limited in its molecular weight (degree of polymerization) if it has the solubility specified above and film-forming ability. Generally, the polymer desirably has an inherent viscosity ($\eta_{inherent} = \ln \eta_{rel}$/concentration of polymer)

in formic acid at 30° C., of at least 0.1 dl/g, preferably 0.15 to 5.0 dl/g, more preferably 0.2 to 2.0 dl/g (0.5 wt% polymer solution).

In the step of coating the polymer on the microporous substrate, the polymer is not necessarily in the form containing the recurring unit of formula (I), and may be in the form of the corresponding precursor containing a recurring unit of formula (XVI) given hereinbelow. Some polymers containing the recurring unit of formula (I) have poor solubility in ordinary solvents and are soluble only in special solvents. In the form of precursor containing the recurring unit (XVI), such sparingly soluble polymers have high solubility in ordinary solvents. Hence, by coating the precursor polymer on the microporous substrate and then converting it into a polymer having the recurring unit of formula (I), the semipermeable membrane of this invention can be easily formed on the microporous substrate. The precursor polymer containing the unit of formula (XVI) generally has an inherent viscosity, in a 1/10 N aqueous solution of sodium chloride at 30° C., of at least 0.1 dl/g, preferably 0.3 to 5.0 dl/g, more preferably 0.5 to 2.0 dl/g (0.5 wt% polymer solution).

Some of the piperidine ring-containing polymers used in accordance with this invention are known per se from known literature references such as U.S. Pat. No. 3,375,233, West German Patent No. 1,957,756, U.S. Pat. No. 3,686,151, and Japanese Patent Publication No. 13674/65. Novel polymers within the definition of the present invention can be produced by methods similar to those known per se. For example, such a polymer can be easily produced, in accordance with the methods described in the known literature references, by cyclopolymerizing a salt of a di(meth)allylamine of the following formula

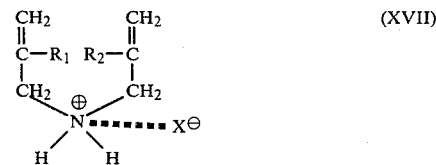

(XVII)

wherein $R_1$ and $R_2$ have the aforesaid meanings, and $X^{\ominus}$ represents an inorganic or organic anion, either singly or mixed with $SO_2$ or a compound capable of generating $SO_2$ under the reaction conditions and if required, together with another monomer copolymerizable with these compounds, in the presence of a radical polymerization catalyst to form a polymer having recurring units of the following formula

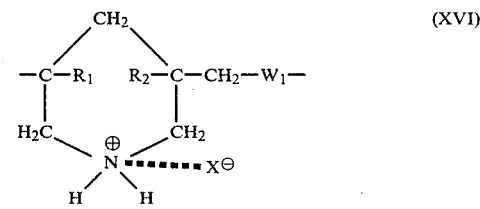

(XVI)

wherein $R_1$, $R_2$, $W_1$ and $X^{\ominus}$ are as defined above, and then treating the resulting polymer containing the recurring unit of formula (XVI) with an organic or inorganic basic compound.

The above polymerization reaction can be carried out by a radical polymerization technique generally in an inert solvent such as water, dimethylformamide, dimethylsulfoxide, tetramethylenesulfone, acetone, methanol, ethanol, benzene, toluene and xylene at a temperature of usually from −30° C. to 100° C., preferably from 0° C. to 50° C. Radical polymerization catalysts include inorganic or organic peroxides such as hydrogen peroxide, potassium persulfate, ammonium persulfate, benzoyl peroxide, dicumyl peroxide, tertiary butyl hydroperoxide, azobisisobutyronitrile, and ascaridole.

The other monomer copolymerizable with the salt of di(meth)allylamine of formula (XVII) may be selected from a wide range of radical polymerizable monomers which copolymerize with the di(meth)allylamine salt in the presence of a radical initiator to form soluble polymers defined hereinabove.

Such a radical polymerizable comonomer generally includes:

(1) monomers containing up to 3, preferably 1 or 2, carbon-carbon ethylenically unsaturated bonds of the vinyl, vinylene, vinylidene or (meth)allyl type (to be referred to as ethylenic comonomers), and (2) monomers not containing such an ethylenically unsaturated bond but copolymerizable with the di(-meth)allylamine salt of formula (XVII) (to be referred to as non-ethylenic comonomers).

They can be used either singly or mixed with each other. The monomers (2) are useful as a monomeric component which gives the unit "$W_2$" in formula ($\alpha$) or ($\beta$) given hereinabove.

Suitable ethylenic comonomers of type (1) contain at most 20 carbon atoms, preferably 2 to 15 carbon atoms, more preferably 4 to 10 carbon atoms, and a molecular weight of 28 to 300, especially 50 to 250. Desirably, the ethylenic comonomers generally have a solubility, in water or a lower alcohol such as methanol, ethanol or propanol at 25° C., of at least 0.5 g, preferably at least 1 g, more preferably at least 5 g, per 100 g of such a solvent.

The ethylenic comonomer (1) is preferably selected from the following compounds ($a_1$) and ($b_1$).

($a_1$) Compounds of the following formula

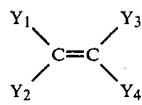

(II)

wherein $Y_1$, $Y_2$, $Y_3$, and $Y_4$, independently from each other, represent a hydrogen atom, a halogen atom, a cyano group, a carboxyl group, a sulfonic acid group, a sulfonate group, a 2-oxopyrrolidinyl group or a group of the formula $-R_3$, $-COOR_3$, $-OCOR_3$, $-COR_3$ or

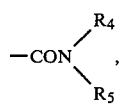

in which $R_3$ represents a monovalent hydrocarbon group having 1 to 10 carbon atoms which may optionally contain 1 to 5 hetero atoms selected from halogen, oxygen, sulfur and nitrogen atoms, and $R_4$ and $R_5$, independently from each other, represent a hydrogen atom or a monovalent hydrocarbon group containing 1 to 10 carbon atoms which may optionally contain 1 to 3 hetero atoms selected from oxygen, sulfur and nitrogen atoms, or taken together, may form a 5- or 6-membered heterocyclic ring together with the nitrogen atom to which they are bonded, which heterocyclic ring may optionally contain 1 or 2 hetero atoms selected from oxygen, sulfur and nitrogen atoms; or at least two of $Y_1$, $Y_2$, $Y_3$ and $Y_4$, taken together, may represent the group

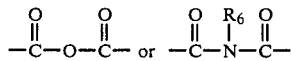

in which $R_6$ represents a hydrocarbon group containing 1 to 10 carbon atoms, or may form a cycloolefin ring containing 5 to 8 carbon atoms together with the carbon-carbon double bond to which the two groups are bonded; with the proviso that each of $Y_1$, $Y_2$, $Y_3$ and $Y_4$ does not have an ethylenic double bond.

($b_1$) Compounds of the following formula

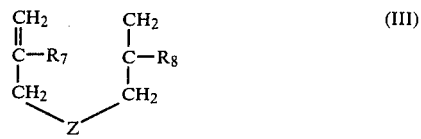

(III)

wherein each of $R_7$ and $R_8$ represents a hydrogen atom or a methyl group; Z represents a group of the formula

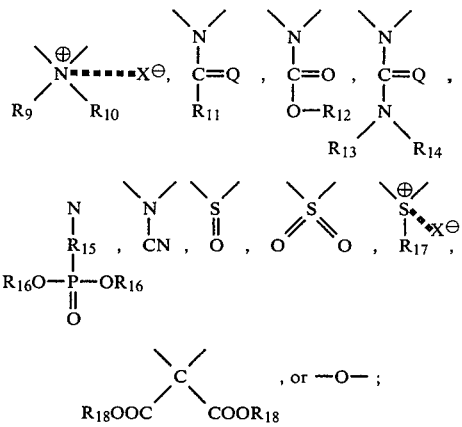

in which $R_9$ and $R_{10}$, independently from each other, represent a hydrogen atom, a substituted or unsubstituted alkyl group containing 1 to 10 carbon atoms, a lower alkenyl group, a cycloalkyl group containing 5 or 6 carbon atoms, a substituted or unsubstituted phenyl group or a substituted or unsubstituted phenyl-lower alkyl group, or $R_9$ and $R_{10}$, together, may form a 5- or 6-membered heterocyclic ring together with the nitrogen atom to which they are bonded, which heterocyclic ring may optionally contain 1 or 2 hetero atoms selected from oxygen, sulfur and nitrogen atoms; $R_{11}$ represents a hydrogen atom, a substituted or unsubstituted alkyl group containing 1 to 10 carbon atoms, a substituted or unsubstituted phenyl group, a substituted or unsubstituted phenyl-lower alkyl group, or a group of the formula

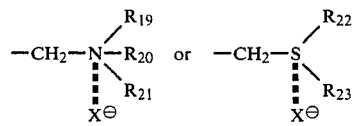

in which $R_{19}$, $R_{20}$ and $R_{21}$, independently from each other, represent a hydrogen atom, a substituted or unsubstituted lower alkyl group, or a substituted or unsubstituted phenyl-lower alkyl group, or two of $R_{19}$, $R_{20}$ and $R_{21}$, taken together, may form a 5- or 6-membered heterocyclic ring together with the nitrogen atom to which they are bonded, which heterocyclic ring may optionally contain 1 or 2 hetero atoms selected from oxygen, sulfur and nitrogen atoms, or $R_{19}$, $R_{20}$ and $R_{21}$, taken together with the nitrogen atom to which they are bonded, may form a substituted or unsubstituted pyridine ring, and $R_{22}$ and $R_{23}$, independently from each other, represent a substituted or unsubstituted alkyl group containing 1 to 3 carbon atoms; $R_{12}$ represents an alkyl group containing 1 to 10 carbon atoms, a substituted or unsubstituted phenyl group, or a substituted or unsubstituted phenyl-lower alkyl group; $R_{13}$ and $R_{14}$, independently from each other, represent a hydrogen atom or an alkyl group containing 1 to 10 carbon atoms, or $R_{13}$ and $R_{14}$, taken together, may form a 5- or 6-membered heterocyclic ring together with the nitrogen atom to which they are bonded, which heterocyclic ring may optionally contain 1 to 2 hetero atoms selected from oxygen, sulfur and nitrogen atoms; $R_{15}$ represents a lower alkylene group; $R_{16}$ represents a hydrogen atom or a lower alkyl group; $R_{17}$ and $R_{18}$, independently from each other, represent a substituted or unsubstituted alkyl group containing 1 to 5 carbon atoms; Q represents an oxygen or sulfur atom; and $X^{\ominus}$ represents an inorganic or organic anion.

In formulae (II) and (III), the term "halogen atom" includes chlorine, fluorine and bromine atoms, the chlorine atom being especially preferred. The term "hydrocarbon group" denotes a linear, branched, or cyclic hydrocarbon. In the linear or branched hydrocarbon group, the carbon chain may be interrupted by a hetero atom selected from oxygen, sulfur and nitrogen atoms in the form of, for example, an ether, thioether or imide linkage. Moreover, at least one of the hydrogen atoms constituting the hydrocarbon group may be substituted with a substituent containing a hetero atom selected from halogen, oxygen, sulfur and nitrogen atoms. Examples of such a substituent include halogen atoms, an oxo group, a hydroxyl group, an oxirane group, and an amino group.

The hydrocarbon group may be saturated or unsaturated. When it is unsaturated, it should not contain an ethylenic unsaturation. It may contain not more than 20 carbon atoms, preferably 1 to 10 carbon atoms, more preferably 1 to 5 carbon atoms.

Specific examples of the hydrocarbon group include alkyl, alkoxyalkyl, hydroxyalkyl, haloalkyl, hydroxyhaloalkyl, glycidyl, aminoalkyl, aryl, and aralkyl groups.

Examples of the 5- or 6-membered heterocyclic ring are pyrrolidine, piperidine, piperazine, morpholine and thiomorpholine rings.

In the expression "substituted or unsubstituted alkyl group", the substituent on the alkyl group includes, for example, halogen atoms, a hydroxyl group, lower alkoxy groups, a cyano group, a carboxyl group, a carbamoyl group, a sulfo group, and a nitro group.

In the expressions "substituted or unsubstituted phenyl group" and "substituted or unsubstituted phenyl-lower alkyl group", the substituent on the phenyl group includes, for example, lower alkyl groups, halogen atoms, lower alkoxy groups, lower haloalkyl groups, a hydroxyl group, a carboxyl group, a nitro group, and alkoxycarbonyl groups.

In the expression "substituted pyridine ring", the substituent on the pyridine ring includes, for example, lower alkyl groups, a carboxyl group, and a carbamoyl group.

Examples of the "inorganic or organic anion" defined for $X^{\ominus}$ are halogen ions, $HSO_4^{\ominus}$, $NO_3^{\ominus}$, $HCOO^{\ominus}$ and $H_3C.COO^{\ominus}$.

In the present specification and appended claims, the term "lower" which qualifies groups or compounds means that such qualified groups or compounds have up to 6, preferably up to 4, more preferably up to 2 carbon atoms.

A preferred group of compounds of formula (II) includes compounds (a$_2$) of the following formula

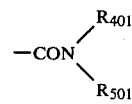

(II-a)

wherein $Y_{21}$ represents a hydrogen atom or a carboxyl group; $Y_{31}$ represents a hydrogen atom or a methyl group; $Y_{41}$ represents a cyano group, a carboxyl group, a sulfo group, a sulfonate group, a 2-oxopyrrolidinyl group, a glycidyl oxymethyl group, or a group of the formula $-COOR_{301}$, $-OCOR_{301}$, $-COR_{301}$ or

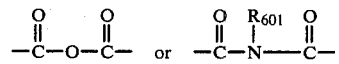

in which $R_{301}$ represents a lower alkyl group, a hydroxy lower-alkyl group, a 2-hydroxy-3-halopropyl group or a glycidyl group, $R_{401}$ and $R_{501}$, independently from each other, represent a hydrogen atom, a lower alkyl group or a hydroxy lower-alkyl group, or when taken together, may form a pyrrolidine, piperidine, piperazine, morpholine or thiomorpholine ring together with the nitrogen atom to which they are bonded; and $Y_{21}$ and $Y_{41}$ together may represent a group of the formula $$-\overset{O}{\underset{\|}{C}}-O-\overset{O}{\underset{\|}{C}}- \quad \text{or} \quad -\overset{O}{\underset{\|}{C}}-\overset{R_{601}}{\underset{|}{N}}-\overset{O}{\underset{\|}{C}}-$$

in which $R_{601}$ represents a lower alkyl group, or $Y_{21}$ and $Y_{41}$ together may form a cyclooctadiene or norbornene ring together with the carbon-carbon double bond to which they are bonded.

Of these, compounds (a$_3$) of the following formula are especially preferred.

(II-b)

wherein $Y_{31}$ represents a hydrogen atom or a methyl group; $Y_{411}$ represents a 2-oxopyrrolidinyl group, a lower alkoxycarbonyl group, a lower alkanoyloxy group, a carbamoyl group, or a mono- or di-lower alkyl carbamoyl group.

Typical examples of the compounds of formula (II) including those of formulae (II-a) and (II-b) are listed below.

(1) Aliphatic olefins $CH_2=CH_2$, $CH_2=CH.CH_3$, $CH_2=CH.CH_2.CH_3$, $CH_2=CH.(CH_2)_3.CH_3$, $CH_2=C\begin{smallmatrix}CH_3\\CH_3\end{smallmatrix}$, $CH_2=C\begin{smallmatrix}C_2H_5\\CH_3\end{smallmatrix}$, $CH_2-C\begin{smallmatrix}C_2H_5\\C_2H_5\end{smallmatrix}$, $H_3C.CH=C\begin{smallmatrix}CH_3\\CH_3\end{smallmatrix}$, $\begin{smallmatrix}H_3C\\H_3C\end{smallmatrix}C=C\begin{smallmatrix}CH_3\\CH_3\end{smallmatrix}$, $H_5C_2.CH=C\begin{smallmatrix}CH_3\\CH_3\end{smallmatrix}$, $H_3C.CH=CH.CH_3$ (2) Hetero atom-containing aliphatic olefins $CH_2=CH.CN$, $CH_2=C(CH_3).CN$, $CH_2=CH.COON$,
$CH_2=C(CH_3).COOH$, $CH_2=CHCl$, $CH_2=CHF$, $CH_2=C(Cl)_2$,
$CH_2=CF_2$, $CH_2=CH.SO_3H$, $CH_2=CH.CH_2.SO_3H$,
$CH_2=CH.CH_2.SO_3Na$, $CH_2=C(CH_3).CH_2.SO_3Na$, $CH_2=CH.\overset{O}{\underset{\|}{C}}.N(CH_3)_2$, $CH_2=CH.\overset{O}{\underset{\|}{C}}.N(C_2H_5)_2$, $H_3C.CH=C\begin{smallmatrix}CH_3\\COOCH_3\end{smallmatrix}$, $H_3C.CH=C\begin{smallmatrix}CH_3\\COOC_2H_5\end{smallmatrix}$, $(H_3C)_2C=C\begin{smallmatrix}CH_3\\COOCH_3\end{smallmatrix}$, $(H_3C)_2C=C\begin{smallmatrix}CH_3\\COOC_2H_5\end{smallmatrix}$, $\begin{smallmatrix}H\\F\end{smallmatrix}C=CF_2$, $\begin{smallmatrix}H\\F\end{smallmatrix}C=C\begin{smallmatrix}Cl\\H\end{smallmatrix}$, $\begin{smallmatrix}F\\F\end{smallmatrix}C=CF_2$, $F_2C=CF_2$, $\begin{smallmatrix}Cl\\F\end{smallmatrix}C=CF_2$, $CH_2=C\begin{smallmatrix}C-O\\|\\C\end{smallmatrix}O$, $CH_2=C\begin{smallmatrix}C=O\\|\\C=O\end{smallmatrix}N-CH_3$, $CH_2=C\begin{smallmatrix}C=O\\|\\C=O\end{smallmatrix}N-C_2H_5$, $CH_2=C\begin{smallmatrix}C=O\\|\\C=O\end{smallmatrix}N-C_3H_7$, $CH_2=CH.\overset{O}{\underset{\|}{C}}.N(C_2H_4OH)_2$, $CH_2=CH.\overset{O}{\underset{\|}{C}}.N\diagup\diagdown O$, $CH_2=CH.\overset{O}{\underset{\|}{C}}.N\diagup\diagdown N.CH_3$, $CH_2=CH.\overset{O}{\underset{\|}{C}}.N\diagup\diagdown S$, $CH_2=CH.\overset{O}{\underset{\|}{C}}.\overset{H}{\underset{}{N}}.CH_2.\overset{OH}{\underset{|}{CH}}.CH_2Cl$, $CH_2=CH.\overset{O}{\underset{\|}{C}}.N\bigcirc$ $CH_2=C(CH_3).\overset{O}{\underset{\|}{C}}.N(CH_3)_2$, $CH_2=CH.\overset{O}{\underset{\|}{C}}.CH_3$, $CH_2=CH.\overset{O}{\underset{\|}{C}}.OCH_3$, $CH_2=CH.\overset{O}{\underset{\|}{C}}.OC_2H_5$, $CH_2=CH.\overset{O}{\underset{\|}{C}}.OC_3H_7$, $CH_2=CH.\overset{O}{\underset{\|}{C}}.OC_4H_9$, $CH_2=CH.O.\overset{O}{\underset{\|}{C}}.CH_3$, $CH_2=CH.O.\overset{O}{\underset{\|}{C}}.C_2H_5$, -continued $CH_2=CH.O.\overset{O}{\underset{\|}{C}}.C_4H_9$, $CH_2=CH.\overset{O}{\underset{\|}{C}}.O.CH_2.\overset{OH}{\underset{|}{CH}}.CH_2Cl$, $CH_2=C(CH_3).\overset{O}{\underset{\|}{C}}.O.CH_2.CH\underset{O}{\overset{}{-}}CH_2$, $CH_2=CH.\overset{O}{\underset{\|}{C}}.O.C_2H_4OH$, $CH_2=CH.\overset{O}{\underset{\|}{C}}.O(CH_2.CH_2.O)_{72}H$, $CH_2=CH.N\bigcirc^{O}$, $HOOC.CH=CH.COOH$, $CH_2=C(COOH)_2$ (3) Alicyclic olefins

[structures of cyclopentene, cyclopentadiene, cyclohexene, cyclobutene, cyclooctene, cyclooctadiene, norbornene, norbornadiene]

(4) Heterocyclic olefins

[structures of heterocyclic olefins with O, NH, N—CH$_3$, N—C$_2$H$_5$]

A preferred group of compounds of formula (III) includes compounds (b$_2$) of the following formula $$\begin{matrix}CH_2 & CH_2\\\|&\|\\C-R_7 & C-R_8\\|&|\\CH_2\diagdown_{Z_1}\diagup CH_2\end{matrix}$$ (III-a)

wherein $R_7$ and $R_8$ each represent a hydrogen atom or a methyl group; $Z_1$ represents a group of the formula $\diagdown\overset{\oplus}{N}\diagup\cdots X_1^{\ominus}$, $\diagdown N\diagup$, $\diagdown N\diagup$, $\diagdown\overset{\oplus}{S}\diagup\cdots X_1^{\ominus}$,
$R_{901}\;R_{101}$  $\underset{R_{111}}{C=O}$  $\underset{OR_{121}}{C=O}$  $R_{171}$ $\diagdown C\diagup$ or $-O-$;
$R_{181}OOC\;COOR_{181}$ $R_{901}$ and $R_{101}$, independently from each other, represent a hydrogen atom, a lower alkyl group, a carboxy lower-alkyl group, a hydroxy lower-alkyl group, a cyano lower-alkyl group, a sulfo lower-alkyl group, a 2-hydroxy-3-halopropyl group, an allyl group, a cyclohexyl group, a phenyl group or a benzyl group, or $R_{901}$ and $R_{101}$, when taken together, may form a pyrrolidine, piperidine, piperazine, morpholine or thiomorpholine ring together with the nitrogen atom to which they are bonded, $R_{111}$ represents a hydrogen atom, a lower alkyl group, a halo lower-alkyl group, a hydroxy lower-alkyl group, a phenyl group, a benzyl group, or a group of the formula

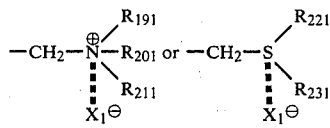

in which $R_{191}$, $R_{201}$ and $R_{211}$, independently from each other, represent a hydrogen atom, a lower alkyl group, a hydroxy lower-alkyl group or a benzyl group, or two of $R_{191}$, $R_{201}$ and $R_{211}$ may form a pyrrolidine, piperidine, piperazine, morpholine or thiomorpholine ring together with the nitrogen atom to which they are bonded, or $R_{191}$, $R_{201}$ and $R_{211}$ together may form a pyridine ring together with the nitrogen atom to which they are bonded, said pyridine ring optionally being substituted with a methyl, carboxyl or carbamoyl group, and $R_{221}$ and $R_{231}$, independently from each other, represent a lower alkyl group or a hydroxy lower-alkyl group; $R_{121}$ represents a lower alkyl group, a phenyl group or a benzyl group; $R_{171}$ and $R_{181}$ each represent a lower alkyl group or a hydroxy lower-alkyl group; and $X_1^\ominus$ represents a halogen ion, bisulfate ion, nitrate ion or carboxylate ion.

Especially preferred among compounds of formula (III-a) are compounds (b₃) of the following formula

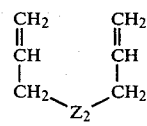 (III-c)

wherein $Z_2$ represents a group of the formula

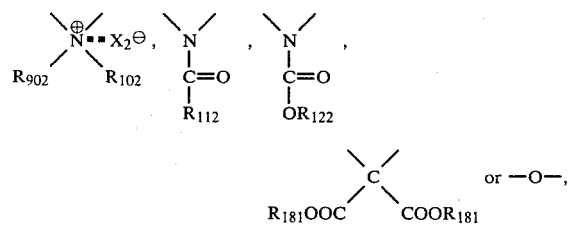

in which $R_{902}$ and $R_{102}$, independently from each other, represent a hydrogen atom or a lower alkyl group, each of $R_{112}$, $R_{122}$ and $R_{181}$ represents a lower alkyl group; and $X_2^\ominus$ represents $Cl^\ominus$, $Br^\ominus$, $I^\ominus$, $NO_3^\ominus$, $HSO_4^\ominus$, $HCOO^\ominus$, or $CH_3COO^\ominus$.

Typical examples of the compounds of formula (III) including the compounds of formulae (III-a) and (III-b) are shown below.

Di(meth)allyl monomers

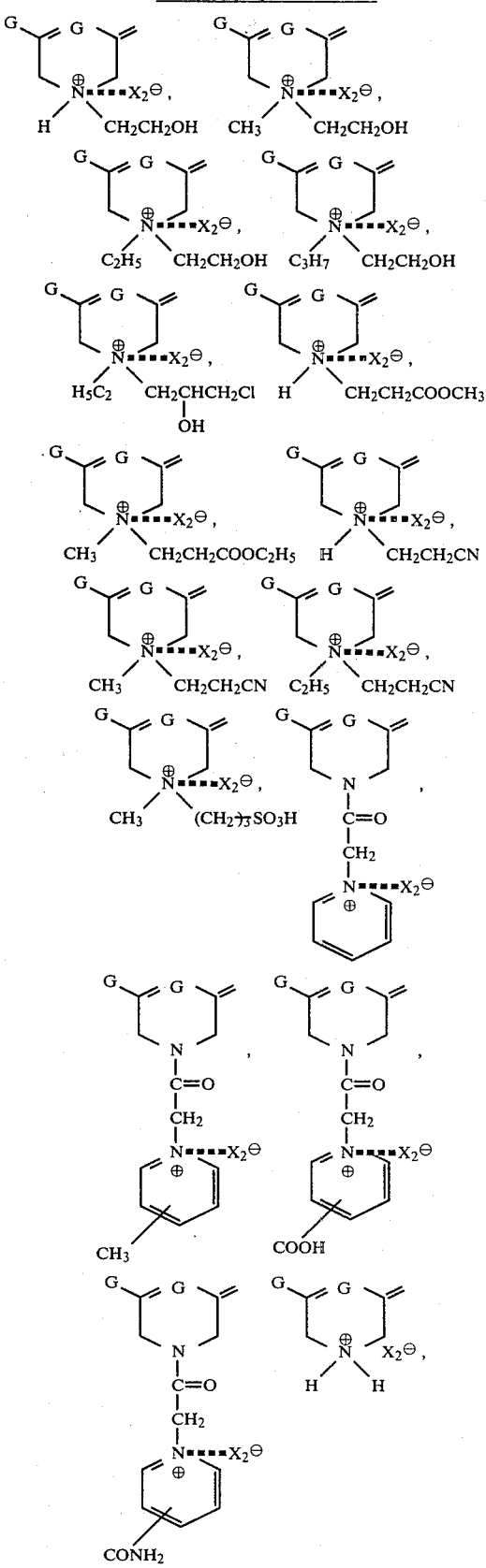

-continued
Di(meth)allyl monomers
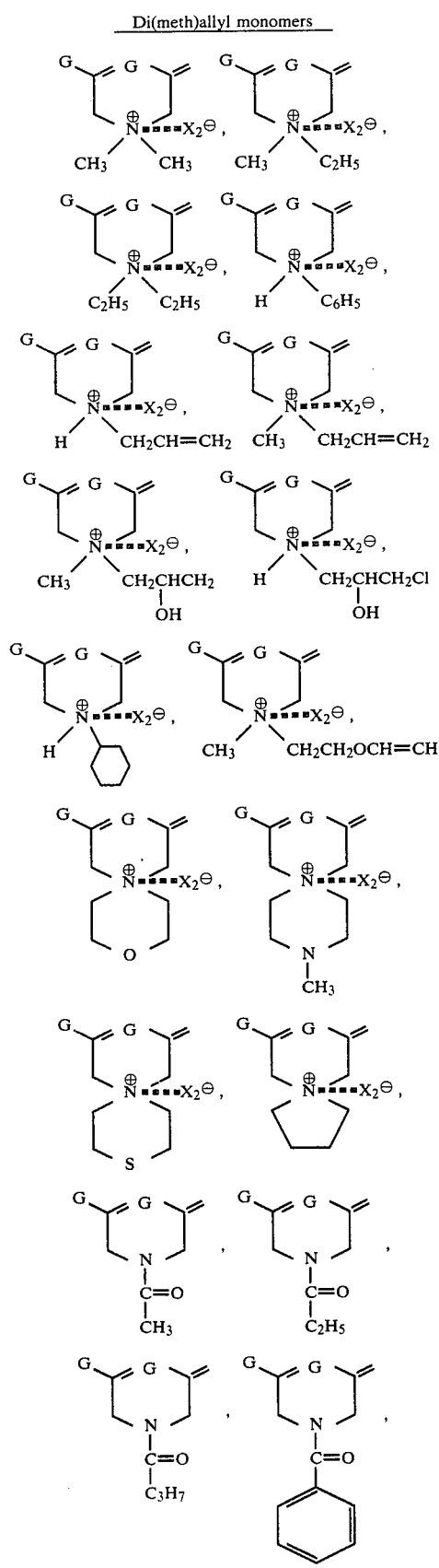
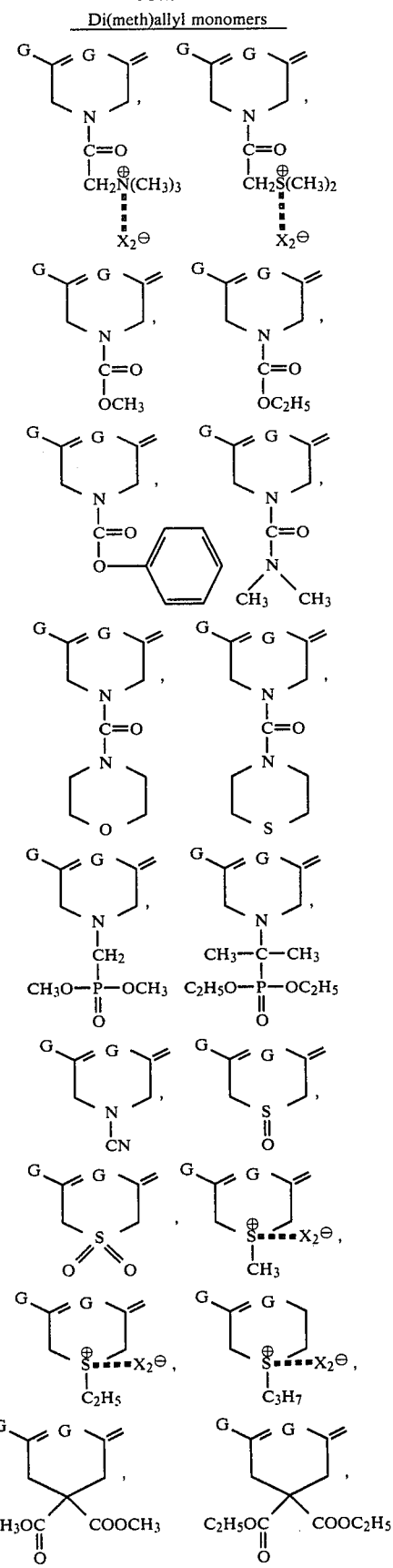

-continued

Di(meth)allyl monomers

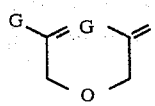

In the above formulae, G represents a hydrogen atom or a methyl group, and $X_2^{\ominus}$ is as defined above.

A 1,6-diene-type monomer such as a di-(2-chloroallyl)ammonium halide described, for example, in S. Kanbara et al. edited, "HANDBOOK OF ORGANIC CHEMISTRY", 3rd edition, pages 504–505 (published on Sept. 30, 1970 by Gihodo, Tokyo, Japan) can also be used in a minor amount as the ethylenic comonomer.

Examples of the non-ethylenic comonomer (2) described hereinabove which gives the unit $W_2$ in formula ($\alpha$) or ($\beta$) above are sulfur dioxide, carbon monoxide, and compounds which release these compounds under the polymerization conditions. Sulfur dioxide is especially preferred because of its tendency to form a copolymer having a high degree of polymerization.

When sulfur dioxide or an $SO_2$-generating compound is used as the comonomer, its suitable amount is $\frac{1}{3}$ to 2 molar times, preferably $\frac{1}{2}$ to 1.5 molar times, preferably approximately 1 molar time, the total moles of the monomer which gives the recurring unit of formula (XVII) and an ethylenic comonomer used optionally.

The comonomers copolymerizable with the salt of di(meth)allylamine of formula (XVII) can be used either singly or as a mixture of two or more of these. When they are used as a mixture, a combination of sulfur dioxide ($SO_2$) with the compound of formula (II) or (III) is especially effective.

In preparing a copolymer containing the recurring unit of formula (I), the di(meth)allylamine salt of formula (XVII) can be used in an amount of at least 25 mole%, preferably at least 30 mole%, more preferably from 35 to 95 mole%, based on the entire monomers, and the comonomer can be used in an amount of at most 75 mole%, preferably not more than 70 mole%, more preferably 65 to 5 mole%, based on the entire monomers.

The use of the comonomer makes it possible to increase the degree of polymerization of the resulting copolymer, to control the hydrophilicity of the copolymer, and/or to control the solubility of the copolymer.

Polymerization of the di(meth)allylamine salt of formula (XVII) or copolymerization of it with the comonomer affords a precursor polymer containing at least 50 mole%, preferably at least 60 mole%, more preferably at least 70 mole%, of the unit of the following formula

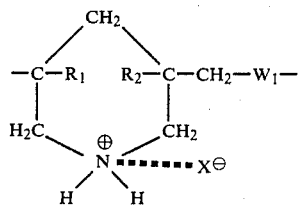

(XVI)

wherein $R_1$, $R_2$, $W_1$ and X are the same as defined above. By treating the precursor with an inorganic or organic basic compound, the above unit of formula (XVI) in the precursor can be converted to the unit of formula (I).

At this time, substantially all of the unit of formula (XVI) may be converted to the unit of formula (I), or a small amount, preferably at most 50 mole%, more preferably not more than 40 mole%, especially preferably not more than 30 mole%, based on the entire recurring units of the unit of formula (XVI) may be left.

The conversion of the unit of formula (XVI) to the unit of formula (I) may be carried out before or after the polymer is applied to the microporous substrate.

Suitable basic compounds used in the conversion reaction are those which are soluble generally in water or lower alcohols such as methanol, ethanol or propanol, or mixtures of water with lower alcohols, advantageously those having a solubility in water, the lower alcohols or mixtures thereof of at least 0.1 g, preferably at least 0.2 g, more preferably at least 0.5 g, per 100 g of water, the lower alcohol or a mixture thereof, at 25° C. As such compounds, organic basic compounds and inorganic basic compounds having the aforesaid solubility can be mentioned. Any inorganic basic compounds having the above solubility can be used. Usable organic basic compounds desirably have a pka value of 5 to 13, preferably 8 to 12. Specific examples of these basic compounds are listed below.

[I] In organic base

Alkali metal hydroxides such as NaOH, KOH or LiOH; alkaline earth metal hydroxides such as $Ba(OH)_2$ and $Sr(OH)_2$; and alkali metal carbonates such as $Na_2CO_3$, $Li_2CO_3$ and $K_2CO_3$; alkali metal bicarbonates such as $NaHCO_3$, $LiHCO_3$ or $KHCO_3$; alkali metal phosphates such as $Na_3PO_4.2H_2O$, $Li_3PO_4$ or $K_3PO_4$; alkali metal phosphites such as $Na_2HPO_4$, $Li_2HPO_4$ or $K_2KPO_4$; alkaline earth metal phosphates such as $Ca(H_2PO_4)_2$ or $MgHPO_4.3H_2O$; and ammonium bases such as $NH_4OH$, $(NH_4)_2CO_3$ or $(NH_4)_3PO_4$; and nitrogen-containing bases such as $NH_3$, $NH_2NH_2$.

[II] Organic bases

[II-1] Primary amines such as $CH_3NH_2$, $C_2H_5NH_2$, $C_3H_7NH_2$,

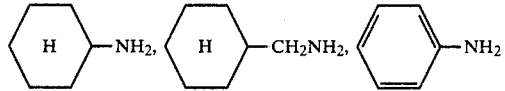

[II-2] Pyridines and piperadines such as

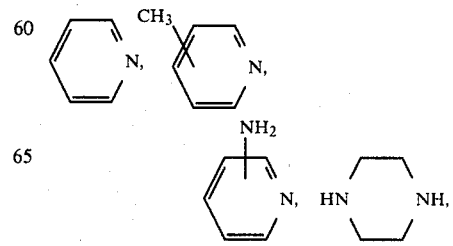

-continued

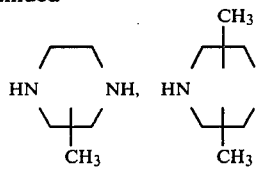

[II-3] Secondary amines such as CH₃NHCH₂CH₂NHCH₃, C₂H₅NHCH₂CH₂OCH₂CH₂NHCH₃,

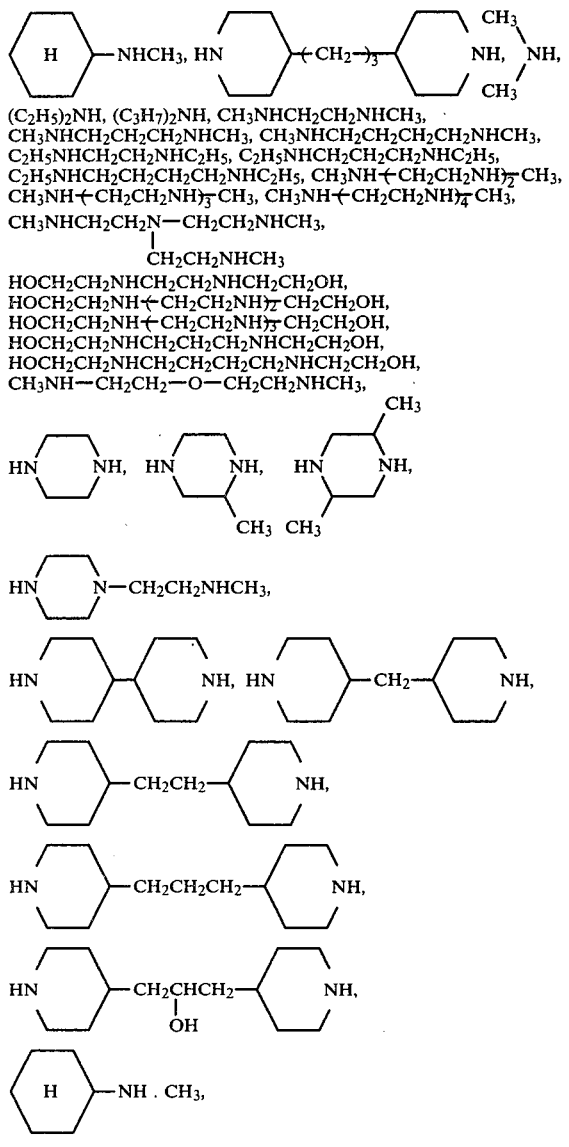

(C₂H₅)₂NH, (C₃H₇)₂NH, CH₃NHCH₂CH₂NHCH₃, CH₃NHCH₂CH₂CH₂NHCH₃, CH₃NHCH₂CH₂CH₂CH₂NHCH₃, C₂H₅NHCH₂CH₂NHC₂H₅, C₂H₅NHCH₂CH₂CH₂NHC₂H₅, C₂H₅NHCH₂CH₂CH₂CH₂NHC₂H₅, CH₃NH(CH₂CH₂NH)₂CH₃, CH₃NH(CH₂CH₂NH)₃CH₃, CH₃NH(CH₂CH₂NH)₄CH₃, CH₃NHCH₂CH₂N—CH₂CH₂NHCH₃,
　　　　　　　　　　|
　　　　　　CH₂CH₂NHCH₃
HOCH₂CH₂NHCH₂CH₂NHCH₂CH₂OH,
HOCH₂CH₂NH(CH₂CH₂NH)₂CH₂CH₂OH,
HOCH₂CH₂NH(CH₂CH₂NH)₃CH₂CH₂OH,
HOCH₂CH₂NHCH₂CH₂NHCH₂CH₂OH,
HOCH₂CH₂NHCH₂CH₂CH₂CH₂NHCH₂CH₂OH,
CH₃NH—CH₂CH₂—O—CH₂CH₂NHCH₃,

[II-4] Tertiary amines such as (CH₃)₃N, (C₂H₅)₃N, diazabicyclo[3,3,1]nonane and 1,8-diazabicyclo[5,4,-0]undecene-7 (DBU).

The amount of the basic compound can be varied depending upon the amount of the unit of formula (XVI) in the precursor polymer. Generally, it is advantageous to use the basic compound in an amount of 0.5 to 5 equivalents, preferably 0.7 to 3 equivalents, especially preferably 0.8 to 2 equivalents, per equivalent of the quaternary ammonium group

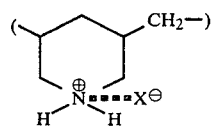

in the unit.

Treatment with the basic compound can be carried out at a temperature of usually about 10° to about 50° C., preferably at room temperature using a solution of the precursor polymer containing the recurring unit of formula (XVI) in a solvent such as water, methanol, ethanol, propanol, acetone, dimethylsulfoxide, tetramethylenesulfone or dimethylformamide.

The basic compound, after the treatment, may be separated and removed from the resulting polymer solution. If desired, the polymer solution may be subjected to a crosslinking reaction to be described hereinbelow without separating the basic compound.

If desired, the polymer so produced may be modified. For example, a copolymer obtained by using vinyl acetate as the comonomer may be hydrolyzed to convert at least a part of the vinyl acetate unit to a vinyl alcohol unit. Or at least a part of the (meth)acrylate ester unit may be converted to a free (meth)acrylic acid unit. Or at least a part of the maleic anhydride unit may be converted to a mono- or di-maleate unit.

Thus, in addition to (i) polymers consisting substantially solely of the recurring unit of formula (I), and (ii) polymers consisting substantially of two types of recurring units, i.e. the recurring unit of formula (I) and at most 50 mole%, preferably not more than 40 mole%, more preferably not more than 30 mole%, of the recurring unit of formula (XVI) remaining unreacted in the treatment of the precursor polymer with the basic compound, which polymers are obtained by incompletely neutralizing precursor polymers consisting substantially only of the recurring unit of formula (XVI) with basic compounds, suitable base polymers for use in producing the semipermeable membrane in accordance with this invention include copolymers composed of (A₁) at least 50 mole%, preferably at least 60 mole%, more preferably at least 70 mole%, of the recurring unit of formula (I), and (B₁) up to 50 mole%, preferably not more than 40 mole%, more preferably not more than 30 mole%, of at least one, preferably one or two, recurring unit selected from those of the formulae

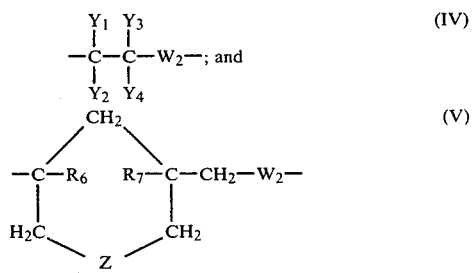

wherein $R_1$, $R_2$, $Y_1$, $Y_2$, $Y_3$, $Y_4$, $R_6$, $R_7$, $X^{\ominus}$ and Z are as defined hereinabove, and $W_2$ represents a direct bond, or a sulfonyl (—$SO_2$—) or carbonyl (—CO—), and preferably, is synonymous with $W_1$.

Especially preferred among these copolymers are copolymers composed of ($A_2$) 60 to 95 mole%, preferably 70 to 95 mole%, of the recurring unit of formula (I), and ($B_2$) 5 to 40 mole%, preferably 5 to 30 mole%, of at least one, preferably one or two, recurring unit selected from

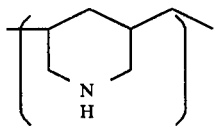 (IV-a)

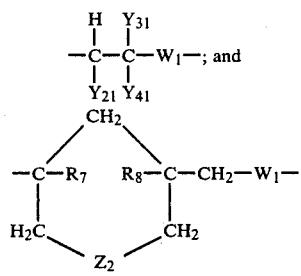 (V-a)

wherein $Y_{21}$, $Y_{31}$, $Y_{41}$, $R_7$, $R_8$, $Z_2$ and $W_1$ are as defined hereinabove.

Most preferred are copolymers composed of ($A_3$) 70 to 85 mole% of the recurring unit of of formula (I), and ($B_3$) 30 to 15 mole% of at least one, especially one, recurring unit selected from

 (IV-b)

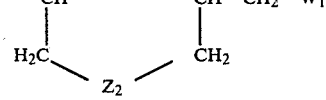 (V-b)

wherein $Y_{31}$, $Y_{41}$, $Z_2$ and $W_1$ are as defined hereinabove.

Thus, typical examples of the polymers containing the recurring unit of formula (I) which are used in this invention are given below.

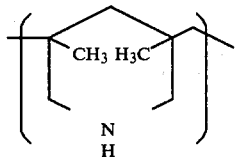 (1)

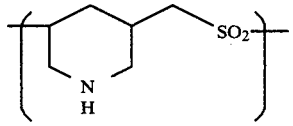 (2)

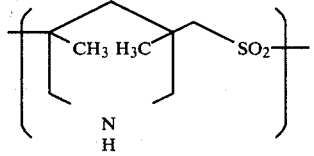 (3)

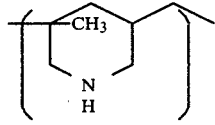 (4)

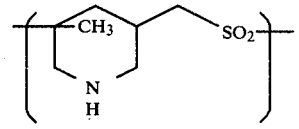 (5)

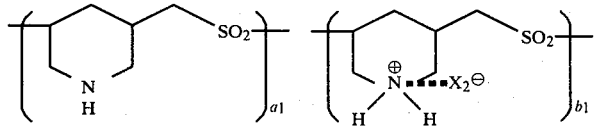 (6)

(7)

-continued
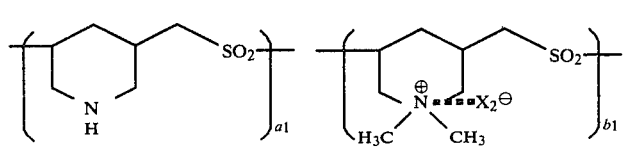
(8)
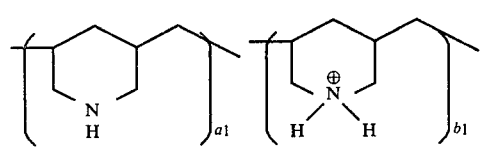
(9)
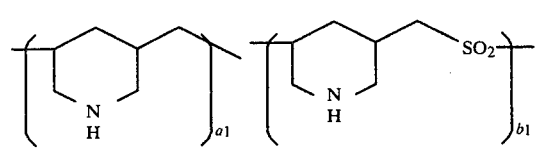
(10)
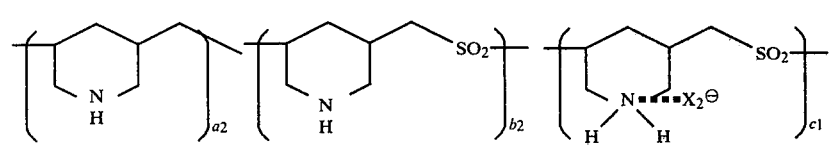
(11)
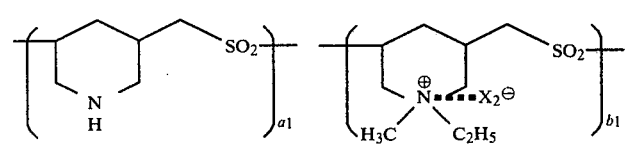
(12)
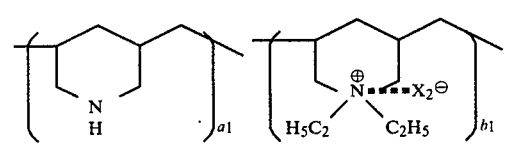
(13)
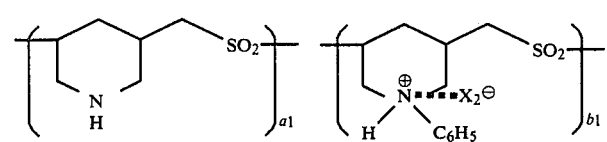
(14)
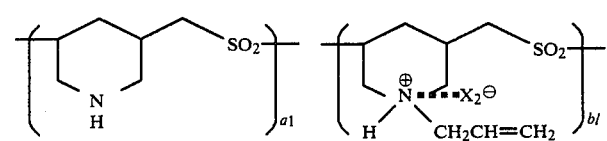
(15)
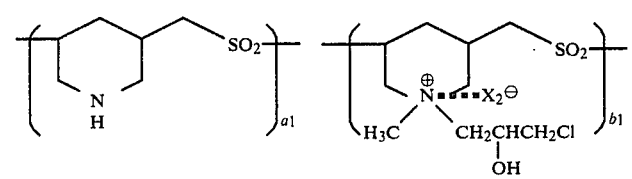
(16)
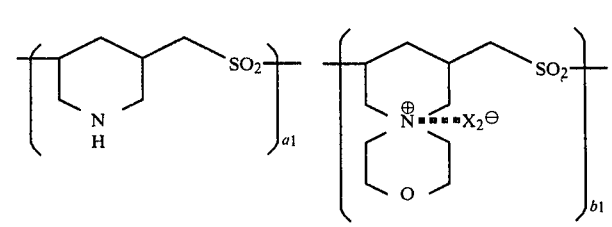
(17)

-continued
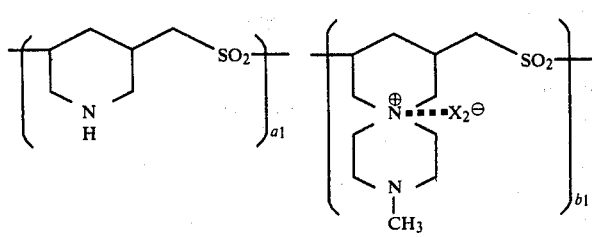 (18)
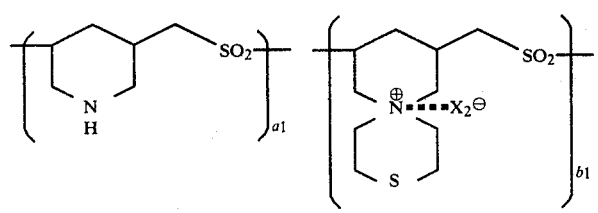 (19)
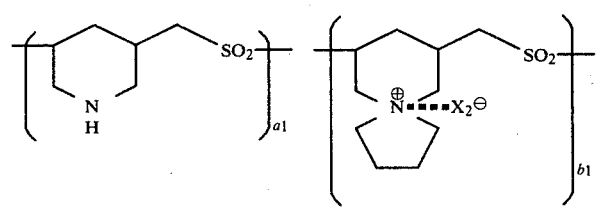 (20)
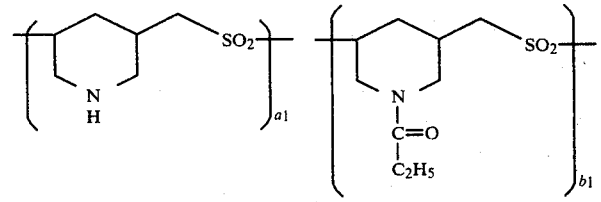 (21)
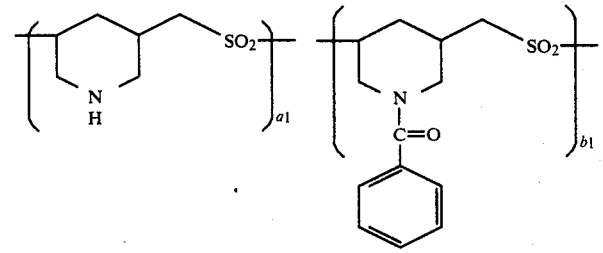 (22)
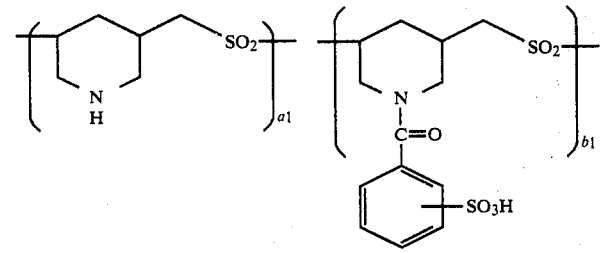 (23)
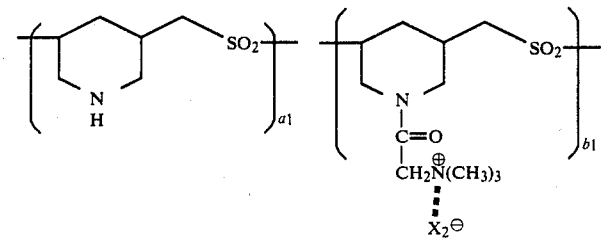 (24)

-continued
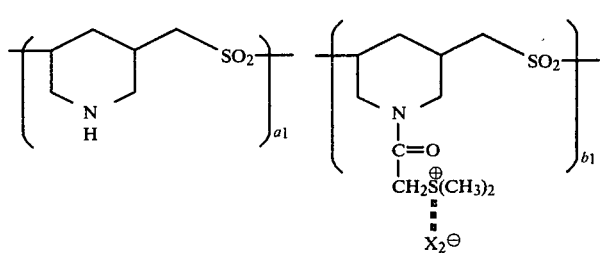 (25)
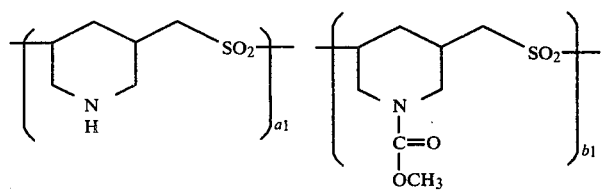 (26)
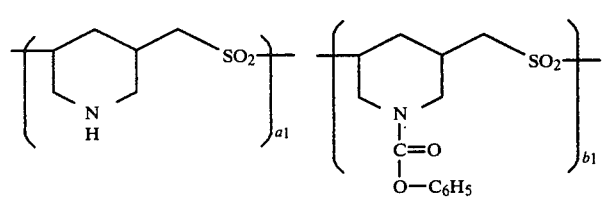 (27)
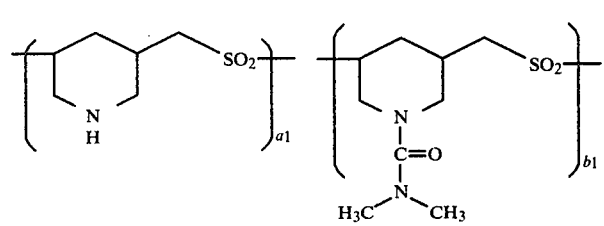 (28)
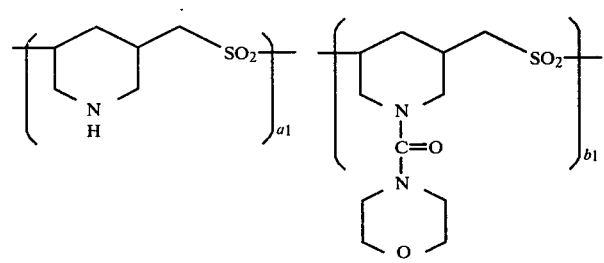 (29)
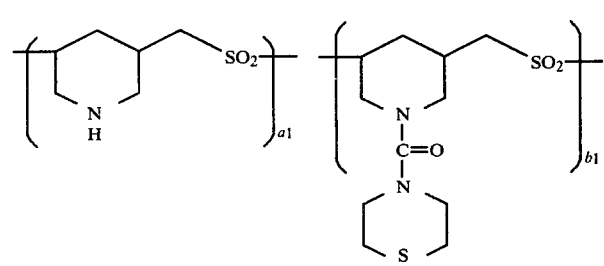 (30)
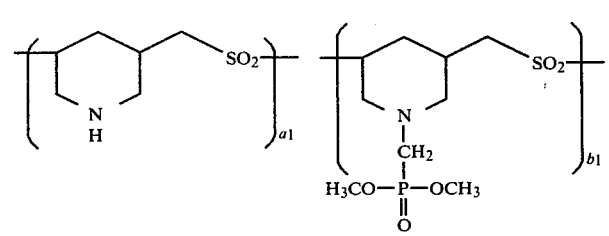 (31)

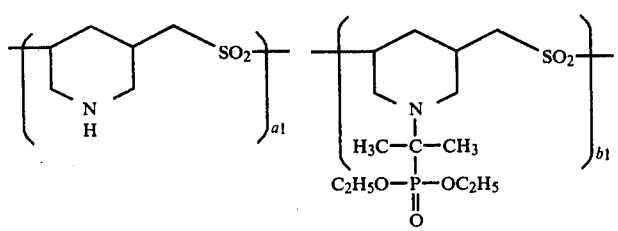
(32)
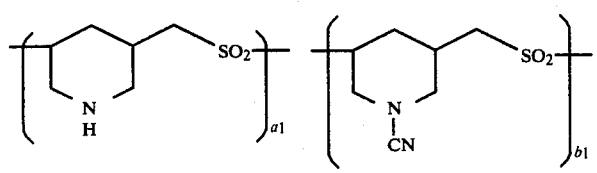
(33)
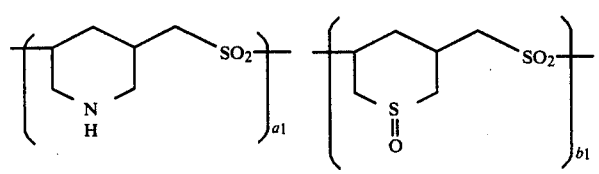
(34)
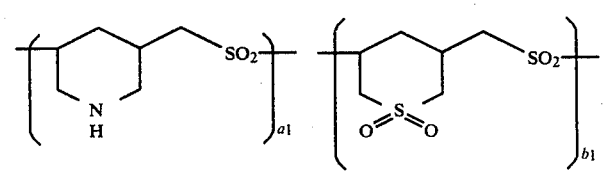
(35)
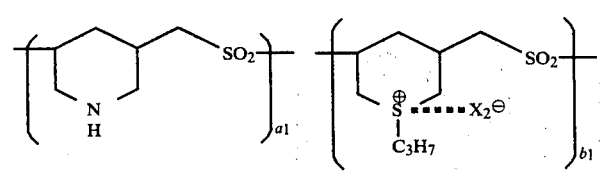
(36)
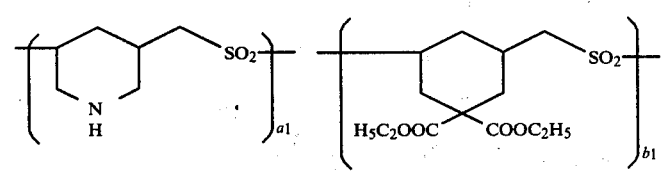
(37)
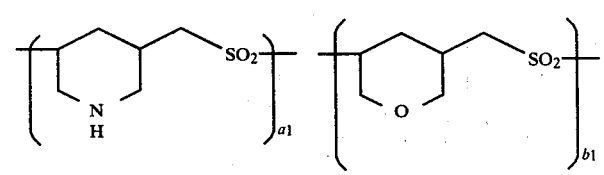
(38)
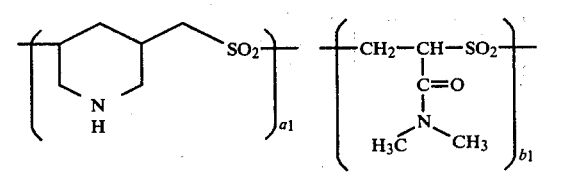
(39)
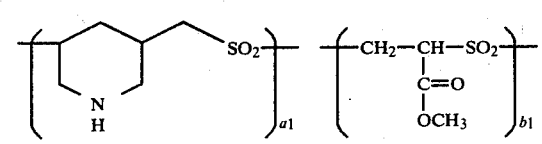
(40)

-continued
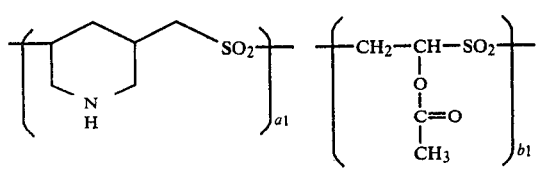 (41)
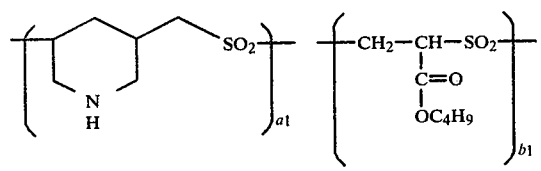 (42)
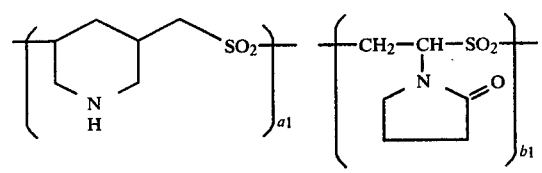 (43)
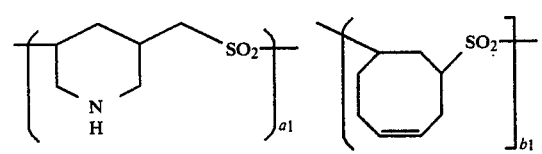 (44)
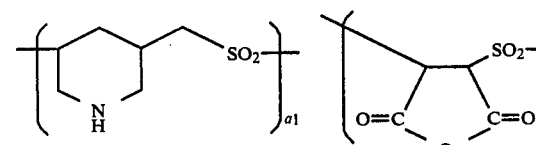 (45)
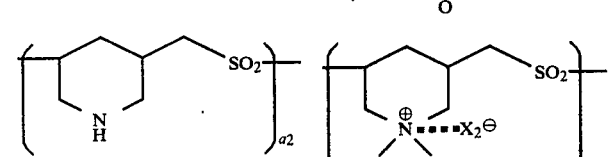 (46)
 (47)
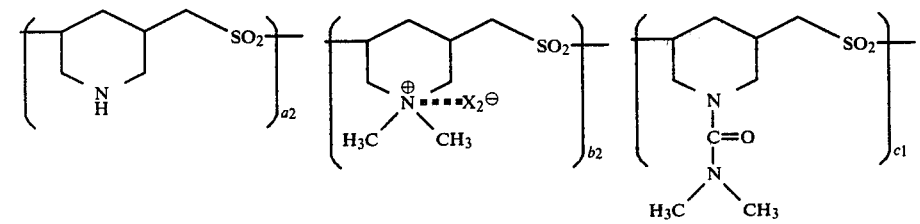 (48)
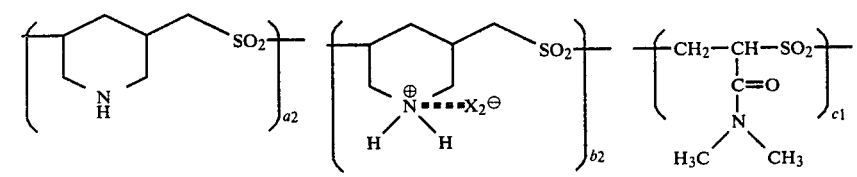 (49)
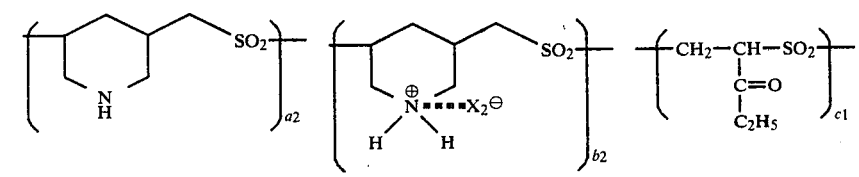

-continued

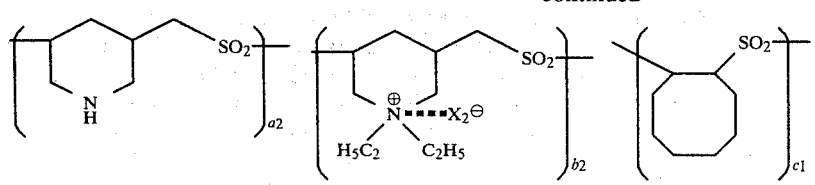

In the above formulae, $X_2^{\ominus}$ is as defined hereinbelow, and is preferably $Cl^-$, $Br^-$ or $NO_3^-$; and $a_1$, $b_1$, $c_1$, $a_2$ and $b_2$ represent numbers which satisfy the following conditions:

$$a_1/b_1 = 20-1$$

$$a_2/(b_2+c_1) = 20-1$$

The aforesaid polymers can be used singly, and also as a mixture with each other.

So long as the objects of this invention can be achieved, the polymer having the unit of formula (I) can be used as a blend with another polymer. Such other polymer includes those which have the ability to form a water-soluble or aqueous emulsion, and form a polymeric alloy as a whole after the blending with the polymer having the unit of formula (I) and the crosslinking of the polymer having the unit (I), and which even when the water-soluble polymer is not crosslinked, can be themselves become substantially insoluble. The proportion of such a polymer varies according to the proportion of the structural unit of formula (I) in the above polymer. It should, however, be such that in the resulting blend, the proportion of the structural unit of formula (I) is at least 50 mole%. If the proportion of the other polymer is too high, it is difficult to form a polymeric alloy. Hence, the other polymer is blended usually in an amount of not more than 30 parts by weight, preferably not more than 10 parts by weight, per 100 parts by weight of the polymer having the unit (I).

The use of such a polymer blend makes it possible also to control the flexibility and hydrophilicity of the resulting composite membrane.

Examples of the other polymer having the aforesaid properties include polyvinyl alcohol, polyvinyl pyrrolidone, poly(sodium acrylate), poly(sodium methacrylate), polyvinyl methyl ether, polyvinyl ethyl ether, a copolymer of methyl vinyl ether and maleic anhydride, a copolymer of vinyl acetate and ethylene, polyvinyl acetate and partially hydrolyzed products of these polymers.

To produce the semipermeable composite membrane of the invention from the polymer containing the recurring unit of formula (I), it is necessary to crosslink the polymer while it is deposited on at least one side of a microporous substrate.

Deposition of the polymer on the microporous substrate can be effected by applying a solution of the polymer containing the recurring unit of formula (I) (to be sometimes referred to hereinbelow as "polymer A") to the substrate, or by applying a solution of the precursor polymer containing the recurring unit of formula (XVI) (to be sometimes referred to hereinbelow as "polymer B") and then treating it with the aforesaid basic compound to convert the recurring unit of formula (XVI) to the recurring unit of formula (I) on the substrate.

The solvent for the preparation of the solution of polymer A or B may be those which do not substantially dissolve or swell a substrate to which the solution is applied. Specific examples include water, lower alcohols, acetone, tetrahydrofuran, dimethylsulfoxide, N-methylpyrrolidone, dimethylformamide, dimethylacetamide and a mixture of at least two of these compounds. Of these, water and aqueous mixtures of these consisting mainly of water are preferred.

The concentration of polymer A or B in the solvent is not critical, and can be varied widely depending upon the type and viscosity of the polymer, etc. Generally, it is advantageous to use the polymer in a concentration of at least 0.05% by weight, preferably 0.07 to 10% by weight, more preferably 0.1 to 5% by weight, based on the weight of the solution.

The polymer A or B is deposited in the form of thin film on the microporous substrate before crosslinking. This deposition can be performed in quite the same manner as a conventional method disclosed, for example, in the above-cited U.S. Patents. For example, the thin film can be formed in situ upon the microporous substrate or it can be formed separately, as by a floatation-deposition method.

Substrates that can be used may be any of the types conventionally used in a reverse osmosis process. They include porous glass, sintered metals, cramics, and organic polymeric materials such as cellulose esters, styrene resins, vinyl butyral resins, polysulfone, chlorinated polyvinyl chloride, etc. described in U.S. Pat. No. 3,676,203. Polysulfone film has been found to be a particularly effective support material for the membranes of the invention, and chlorinated polyvinyl chloride is another very effective support material. Preparation of polysulfone microporous substrate is described in Office of Saline Water Research and Development Progress Report No. 359, October 1968.

These substrates preferably have a surface pore size of generally 100 to 1000 Å, but are not limited to these specific sizes. Depending upon the use of the final membrane product, surface pores ranging in size from about 50 Å to about 5000 Å may be acceptable.

The substrate may be of an isotropic structure or an anisotropic structure, desirably of the latter structure. When the membrane constant of the substrate is less than $10^{-4}$ g/cm$^2$.sec.atm, the water permeability of the substrate is too low, and when it is more than 1 g/cm$^2$.sec.atm, the salt rejection tends to be extremely low. Accordingly, preferred membrane constants are 1 to $10^{-4}$ g/cm$^2$.sec.atm, and the best results are obtained with a membrane constant of $10^{-1}$ to $10^{-3}$ g/cm$^2$.sec.atm. The term "membrane constant", as used herein, denotes the amount of pure water which permeates the membrane under a pressure of 2 kg/cm$^2$, and is expressed in g/cm$^2$.sec.atm.

Preferably, the substrate used is reinforced at its back with a woven or non-woven cloth, etc. Examples of the woven or non-woven cloth are those of polyethylene terephthalate, polystyrene, polypropylene, nylon or vinyl chloride resins.

When it is desired to form a thin film of the polymer A or B in situ on the microporous substrate, the microporous substrate is treated with a solution of the polymer A or B. The treatment can be performed by coating at least one surface of the substrate with a solution of the polymer A or B by a suitable method such as solution casting, brush coating, spraying, wig coating or roll coating; or by immersing the substrate in a solution of the polymer A or B.

The substrate so treated by coating or immersion is then subjected to a drain treatment. The drain treatment can be carried out generally at room temperature for 1 to 30 minutes, preferably 5 to 20 minutes. As a result, a substrate is obtained which has formed thereon a thin layer of the polymer solution with a suitable thickness that can vary according to the concentration of the polymer in the polymer solution. Usually, a thin film material of the polymer A or B having a total thickness of about 1,000 to about 50,000 Å, preferably about 2,000 to about 10,000 Å, is deposited on the surface of the substrate.

The substrate on which polymer A has been deposited can be directly subjected to a crosslinking treatment. However, the substrate on which polymer B has been deposited must be contacted with a solution of the aforesaid basic compound prior to the crosslinking treatment, so as to convert polymer B to polymer A on the substrate.

This conversion can be effected, for example, by dipping the substrate having polymer B deposited thereon in a solution containing the aforesaid basic compound, or by spraying a solution of the basic compound onto that surface of the substrate on which polymer B has been deposited to contact polymer B with the basic compound. The concentration of the basic compound in the solution is not critical, but generally, the suitable concentration of the basic compound is from about 1 to about 10% by weight. The temperature at which the aforesaid treatment is carried out is generally room temperature, but if desired, an elevated temperature of up to about 50° C. may be employed.

Alternatively, the contacting of the polymer B with the basic compound on the substrate may be performed by exposing the substrate having polymer B deposited thereon to a vapor of the basic compound. Such a vapor includes, for example, ammonia, methylamine, ethylamine, dimethylamine, diethylamine, trimethylamine and triethylamine. This contacting treatment is generally room temperature, but if desired, an elevated temperature of up to about 50° C. can be used. The treatment can be performed for about 30 seconds to about 5 minutes under these conditions.

In this manner, the polymer B is converted to polymer A on the substrate.

The substrate having the thin film deposited on the support is then subjected to a crosslinking treatment by using a polyfunctional compound containing at least two functional groups selected from acid halide, sulfonyl halide, isocyanate, N-haloformyl, haloformate and acid anhydride groups to crosslink the thin film material of the polymer A on the substrate.

The crosslinking reaction is effected by an interfacial reaction between the surface of the film material of the polymer A and the polyfunctional compound to produce a thin film having permselectivity on the surface of the substrate. Since the main purpose of the polyfunctional compound is to provide an interfacial reaction substantially concentrated on or confined to the surface of the film of the polymer A, the polyfunctional compounds should be preferably selected in accordance with the principles of interfacial reaction. For example, when the polymer A film is coated from an aqueous solution, the polyfunctional compound or polyfunctional compound solution should be substantially insoluble in water. For this and other reasons, various polyfunctional compounds compatible with nonpolar organic solvents such as hydrocarbons but substantially insoluble in water are preferred. Selection of the polyfunctional compounds is also governed by empirical conditions, e.g. the salt rejection and flux properties or resistance to compaction of the ultimately obtained membrane, and the selection can be achieved easily by any one skilled in the art by performing small-scale routine experiments.

The functional groups of the polyfunctional compounds that can be used in this invention are either one of acid halide groups (—COX), sulfonyl halide groups (—SO$_2$X), N-haloformyl groups

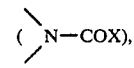

haloformate groups (—OCOX), isocyanate groups (—NCO) and acid anhydride groups

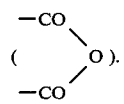

At least two, preferably 2 or 3, of these functional groups can be contained per molecule.

Preferred functional groups are acid halide, sulfonyl halide and acid anhydride groups, the first two being especially preferred. Another suitable functional group is an isocyanate group. Two or more functional groups present in one molecule may be of the same type or of different types. The polyfunctional compounds generally have a cyclic structure, and may be aromatic, heterocyclic or alicyclic. For the purpose of the present invention, aromatic polyfunctional compounds have been found to be especially effective.

Any mononuclear or polynuclear (especially, binuclear) aromatic polyfunctional compounds having at least two, preferably two or three, functional groups bonded to the aromatic ring and 6 to 20, preferably 6 to 15, carbon atoms can be suitably used in the present invention. Preferably, the aromatic ring or rings should not contain a substituent other than the above functional groups. However, one or two groups which do not substantially affect the crosslinking reaction, such as lower alkyl groups, lower alkoxy groups or halogen atoms, may be present on the aromatic ring.

An especially desirable group of the aromatic polyfunctional compounds includes those of the following formula

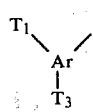 (XVIII)

wherein Ar represents a benzene ring, a naphthalene ring, or the ring

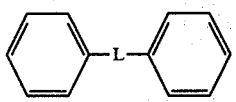

in which L represents —CH$_2$—,

—O—, SO$_2$— or —CO—, T$_1$, T$_2$ and T$_3$, independently from each other, represent an acid halide, sulfonyl halide, isocyanate, N-haloformyl or haloformate group, especially the first three groups; or T$_1$ and T$_2$ together represent an acid anhydride group; it is especially desirable that T$_1$, T$_2$ and T$_3$ be selected from acid halide and sulfonyl halide groups. Typical examples of the aromatic polyfunctional groups are shown below.

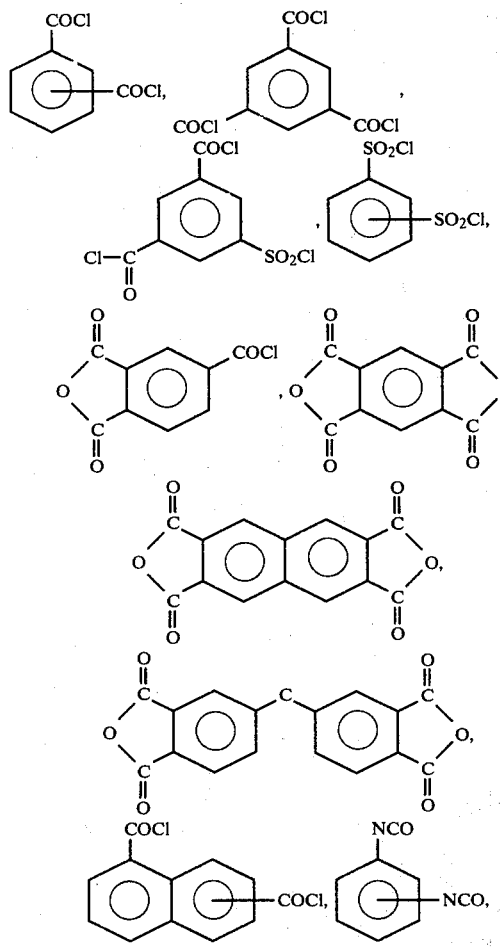

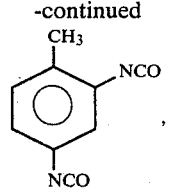

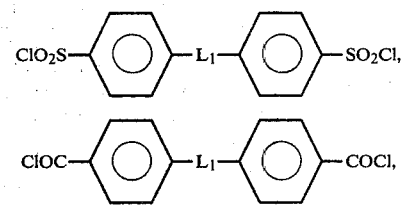

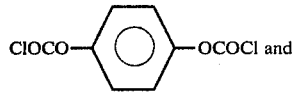

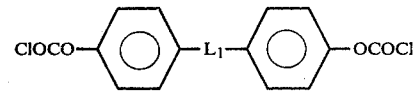

(L$_1$ represents a direct bonding, —O—, —CH$_2$—,

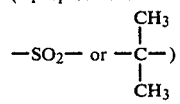

—SO$_2$— or )

Especially advantageous aromatic polyfunctional compounds are isophthaloyl chloride, terephthaloyl chloride, trimesiloyl chloride and 3-chlorosulfonyl-isophthaloyl chloride.

Preferred heterocyclic polyfunctional compounds that can be used in this invention are 5- or 6-membered heteroaromatic or heteroalicyclic compounds having two or three functional groups bonded to the heterocyclic ring and containing 1 to 2 nitrogen, oxygen or sulfur atoms as hetero atoms. Examples are as follows:

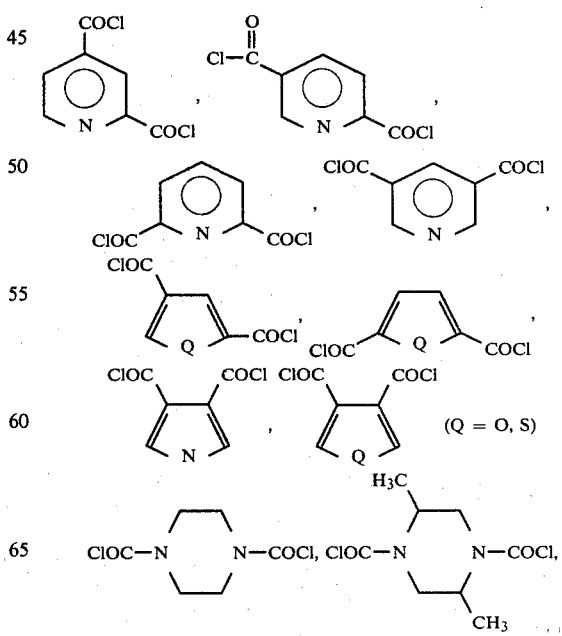

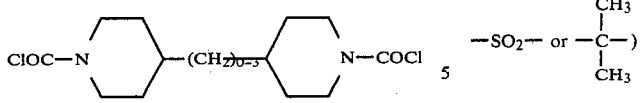

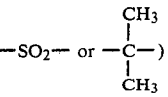

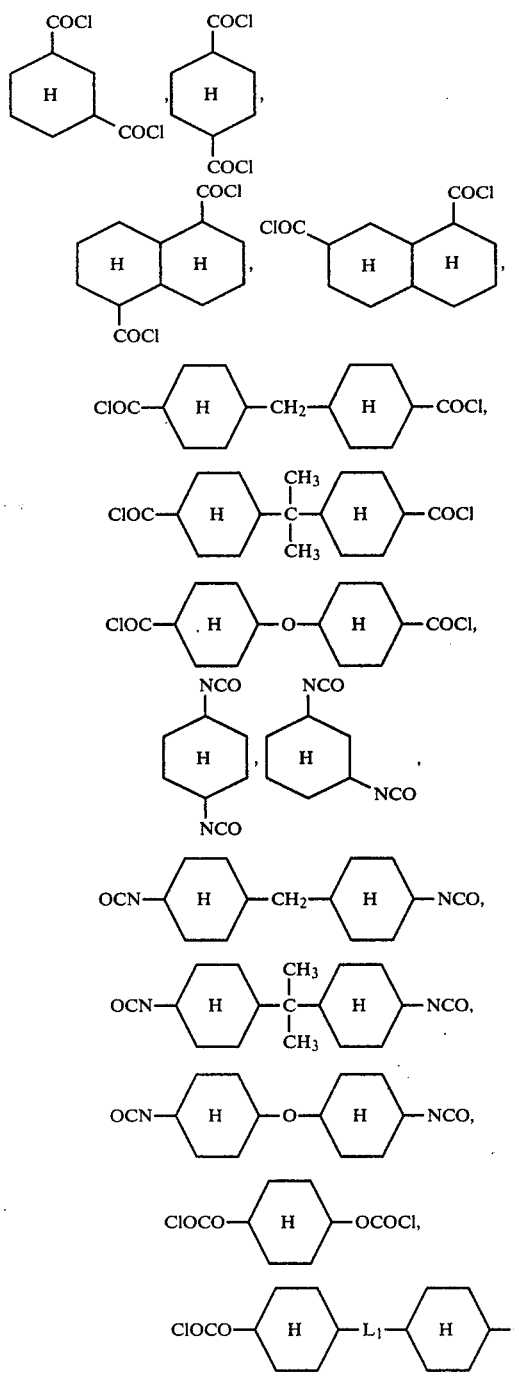

(L₁ represents a direct bonding, —O—, —CH₂—,

—SO₂— or —C(CH₃)(CH₃)—)

Preferred aliphatic polyfunctional compounds that can be used are those having 2 functional groups and containing 5 to 20, preferably 6 to 15, carbon atoms. Examples are as follows:

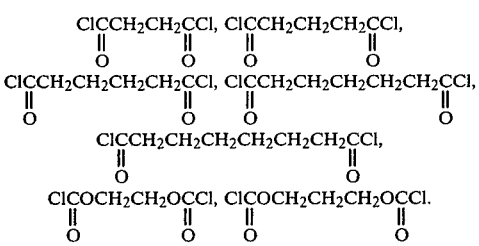

The aromatic heterocyclic or alicyclic polyfunctional compounds can be used either alone or as a mixture of two or more.

It has been found that the salt rejecting and/or flux properties of the finally obtained membrane can be improved by using trifunctional compounds rather than difunctional ones when they are used singly, and by using a combination of a difunctional compound and a trifunctional compound when they are used in combination. Thus, especially preferred polyfunctional compounds to be used in the present invention are trifunctional aromatic compounds, and mixtures of difunctional aromatic compounds and trifunctional aromatic compounds. When a mixture of a difunctional compound and a trifunctional compound is used, the mixing ratio between them is not critical. Generally, the weight ratio of the difunctional compound to the trifunctional compound is from 10:1 to 1:3, preferably from 5:1 to 1:1.

The crosslinking of the film material of the polymer A can be performed usually by contacting the film with a solution of the polyfunctional compound. The solvent used to dissolve the polyfunctional compound should not substantially dissolve the polymer A and the substrate material, and includes hydrocarbons such as n-hexane, n-heptane, n-octane, cyclohexane, n-nonane and n-decane. The optimal concentration of the polyfunctional compound in the solvent may vary considerably depending upon the specific compound, solvent, substrate, etc., and is best determined experimentally. However, concentrations of about 0.5 to 5.0, preferably about 1.0 to 3.0, % by weight are generally satisfactory.

Conveniently, the crosslinking is accomplished on the inferface between the film and the solution by immersing the film in the solution of the polyfunctional compound. In order to promote this crosslinking reaction, it is possible to include a crosslinking accelerator into the film of the polymer A. This accelerator serves to help the polyfunctional compound diffuse into the polymer, and/or to capture hydrogen halide released at the time of crosslinking reaction. Such an accelerator may include, for example, soluble basic compounds and surface-active agents.

Advantageously, suitable soluble basic compounds have a solubility in water or a lower alcohol such as methanol, ethanol or propanol or a mixture thereof of at least 0.1 g, preferably at least 0.2 g, more preferably at least 0.5 g, per 100 g of water, the lower alcohol or a mixture thereof at 25° C. As such compounds, inorganic basic compounds and organic basic compounds having the above solubility can be mentioned. Any inorganic basic compounds having the above solubility can be used. The organic basic compounds should desirably have a pka value of generally 5 to 12, preferably 8 to 12.

Examples of the soluble basic compounds are the inorganic and organic bases [I] and [II] exemplified hereinabove as neutralizing agents for converting polymer B into polymer A. It has been found that polyimino compounds containing 2 to 5, and preferably 2, imino groups (—NH—) exhibit especially good improving effects. Suitable polyimino compounds are selected from compounds of the following formulae $$A_1-NH-A_2-NH-A_3 \quad (VI)$$

$$A_4-NH(-CH_2-CH_2-N)_{\overline{a}}A_5 \quad (VII)$$
$$\qquad\qquad\qquad\qquad |$$
$$\qquad\qquad\qquad\qquad A_6$$

(VIII)

HN⟨ringN—A_7—NH—A_8

(IX) and

HN⟨ring—A_9—ring⟩NH (X)

A_{10}  A_{11}
⟨ring with HN and NH⟩
  A_{12} wherein $A_1$ and $A_3$, independently from each other, represent a lower alkyl group; $A_2$ represents an alkylene group containing 1 to 10 carbon atoms which may contain an ether linkage; and $A_4$ and $A_5$, independently from each other, represent a lower alkyl group optionally substituted with a cyano, hydroxyl or lower alkoxycarbonyl group; $A_6$ represents a hydrogen atom or a group of the formula —CH$_2$—CH$_2$—NH—A$_4$; $A_7$ is a lower alkylene group; $A_8$ represents a lower alkyl group optionally substituted with a cyano, hydroxyl or lower alkoxycarbonyl group; $A_9$ represents a lower alkylene group; at least one of $A_{10}$, $A_{11}$ and $A_{12}$ is a lower alkyl group and the remainder are hydrogen atoms; and a is an integer of 1 to 10.

These polyimino compound capture hydrogen halide, which may be formed by the crosslinking reaction to promote the crosslinking reaction, positively participate in the crosslinking reaction itself, and also have the effect of improving the mechanical strength or oxidation resistance of the resulting semipermeable membrane. They are especially suitable as crosslinking accelerators.

The polyimino compound is used in an amount of generally 0.5 to 3.0 moles, preferably 0.7 to 3.0 moles, per equivalent of the imino group in the polymer A.

Of the polyimino compounds of formulae (VI), (VII), (VIII), (IX) and (X), those of formulae (IX) and (X) are especially preferred.

Typical examples of the polyimino compounds of formulae (VI) to (X) include the following.

CH$_3$NHCH$_2$CH$_2$NHCH$_3$, CH$_3$NHCH$_2$CH$_2$CH$_2$NHCH$_3$,

-continued

CH$_3$NHCH$_2$CH$_2$CH$_2$CH$_2$NHCH$_3$, C$_2$H$_5$NHCH$_2$CH$_2$NHC$_2$H$_5$,
C$_2$H$_5$NHCH$_2$CH$_2$CH$_2$NHC$_2$H$_5$,
C$_2$H$_5$NHCH$_2$CH$_2$CH$_2$CH$_2$NHC$_2$H$_5$,
CH$_3$NH(CH$_2$CH$_2$NH)$_{\overline{2}}$CH$_3$, CH$_3$NH(CH$_2$CH$_2$NH)$_{\overline{3}}$CH$_3$,
CH$_3$NH(CH$_2$CH$_2$NH)$_{\overline{4}}$CH$_3$,
CH$_3$NHCH$_2$CH$_2$NCH$_2$CH$_2$NHCH$_3$,
$\qquad\qquad\qquad |$
$\qquad\qquad CH_2CH_2NHCH_3$
HOCH$_2$CH$_2$NHCH$_2$CH$_2$NHCH$_2$CH$_2$OH,
HOCH$_2$CH$_2$NH(CH$_2$CH$_2$NH)$_{\overline{2}}$CH$_2$CH$_2$OH,
HOCH$_2$CH$_2$NH(CH$_2$CH$_2$NH)$_{\overline{3}}$CH$_2$CH$_2$OH,
HOCH$_2$CH$_2$NHCH$_2$CH$_2$CH$_2$NHCH$_2$CH$_2$OH,
HOCH$_2$CH$_2$NHCH$_2$CH$_2$CH$_2$CH$_2$NHCH$_2$CH$_2$OH,
CH$_3$NH—CH$_2$CH$_2$—OCH$_2$CH$_2$NHCH$_3$, HN⟨ring⟩NH, HN⟨ring-CH$_3$⟩NH, HN⟨ring-CH(CH$_3$)⟩NH,
         CH$_3$            CH$_3$ HN⟨ring⟩N—CH$_2$CH$_2$NHCH$_3$, HN⟨ring-ring⟩NH, HN⟨ring⟩—CH$_2$—⟨ring⟩NH, HN⟨ring⟩—CH$_2$CH$_2$—⟨ring⟩NH, HN⟨ring⟩—CH$_2$CH$_2$CH$_2$—⟨ring⟩NH, HN⟨ring⟩—CH$_2$CHCH$_2$—⟨ring⟩NH,
              |
              OH Type (VI)
CH$_3$NHCH$_2$CH$_2$NHCH$_3$, CH$_3$NHCH$_2$CH$_2$CH$_2$NHCH$_3$,
CH$_3$NHCH$_2$CH$_2$CH$_2$CH$_2$NHCH$_3$, C$_2$H$_5$NHCH$_2$CH$_2$NHC$_2$H$_5$,
C$_2$H$_5$NHCH$_2$CH$_2$CH$_2$NHC$_2$H$_5$,
C$_2$H$_5$NHCH$_2$CH$_2$CH$_2$CH$_2$NHC$_2$H$_5$,
HOCH$_2$CH$_2$NHCH$_2$CH$_2$NHCH$_2$CH$_2$OH,
HOCH$_2$CH$_2$NHCH$_2$CH$_2$CH$_2$NHCH$_2$CH$_2$OH,
CH$_3$NH—CH$_2$CH$_2$—OCH$_2$CH$_2$NHCH$_3$,
HOCH$_2$CH$_2$NHCH$_2$CH$_2$NHCH$_2$CH$_2$OH,
Type (VII)
CH$_3$NH(CH$_2$CH$_2$NH)$_{\overline{2}}$CH$_3$, CH$_3$NH(CH$_2$CH$_2$NH)$_{\overline{3}}$CH$_3$,
CH$_3$NH(CH$_2$CH$_2$NH)$_{\overline{4}}$CH$_3$,
CH$_3$NHCH$_2$CH$_2$NCH$_2$CH$_2$NHCH$_3$,
$\qquad\qquad\qquad |$
$\qquad\qquad CH_2CH_2NHCH_3$
HOCH$_2$CH$_2$NH(CH$_2$CH$_2$NH)$_{\overline{2}}$CH$_2$CH$_2$OH,
HOCH$_2$CH$_2$NH(CH$_2$CH$_2$NH)$_{\overline{3}}$CH$_2$CH$_2$OH,
Type (VIII)

HN⟨ring⟩N—CH$_2$CH$_2$NHCH$_3$, HN⟨ring⟩N—CH$_2$CH$_2$NHC$_2$H$_5$,

HN⟨ring⟩N—CH$_2$CH$_2$NHCH$_2$CH$_2$OH,

HN⟨ring⟩N—CH$_2$CH$_2$NHCH$_2$CH$_2$CN,

Type (IX)

-continued

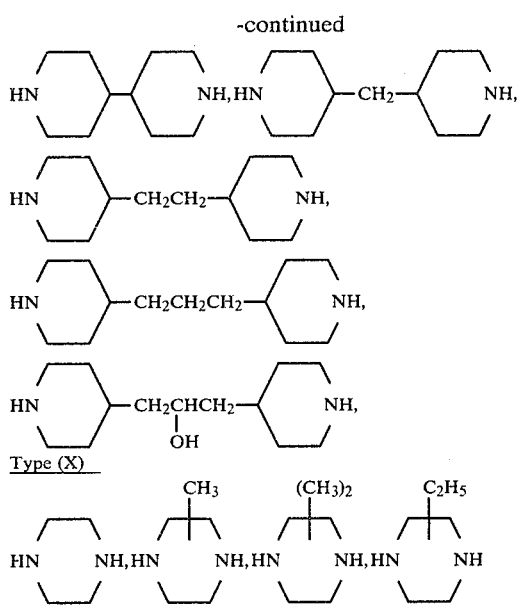
Type (X)

As described hereinabove, the soluble basic compounds are also used as neutralizing agents for converting polymer B into polymer A. Accordingly, it is possible to use the basic compound in an amount in excess of the stoichiometrical amount required to convert the polymer B into polymer A, thus incorporating the basic compound into the resulting polymer A.

The interfacial crosslinking reaction between the surface of the film and the polyfunctional agent can be carried out at about $-10°$ to about 100° C., preferably 20 to 50° C., for a period of 10 seconds to 30 minutes, preferably 30 seconds to 10 minutes. This interfacial reaction can be performed so that it is concentrated largely on the surface of the film, and it is not necessary to reduce the water sensitivity of the internal regions of the film.

Then, the film supported on the substrate is optionally subjected to a drain treatment to drain the excess of the polyfunctional compound solution for 10 seconds to 2 minutes, and then heat treated at a temperature of 70° to 150° C., preferably 90° to 130° C. This can complete the crosslinking reaction and achieve the insolubilization of the film of the polymer A.

Thus, a composite membrane is obtained when has a thin film of the crosslinked polymer A having permselectivity on the surface of the microporous substrate.

Thus, according to this invention, there is provided a permselective composite membrane comprising a microporous substrate and a permselective thin film of the type described hereinabove formed on one surface of the microporous substrate. In the composite membrane, the thickness of the permselective thin film is not strictly set, and it may have a total thickness of at least 100 Å, usually 1,000 to 4,000 Å.

It is also within the scope of this invention to provide a protective coating on the surface of the composite membrane of the invention. Deposition of the protective coating on the thin film is carried out by coating the barrier film with a water-soluble organic polymer such as polyvinyl alcohol, polyvinyl pyrrolidone, polyacrylamide, polyacrylic acid, polyvinyl methyl ether, and polyvinyl ethyl ether. Polyvinyl alcohol, polyvinyl pyrrolidone and polyvinyl methyl ether are preferred. The polymer is used as a 1-15 wt.%, preferably 3-10 wt.%, aqueous solution. In a specific embodiment, the dried semipermeable composite membrane is passed through a solution of the water-soluble organic polymer or coating the polymer solution on the surface of this barrier film by known means such as dip coating, spraying, or brush coating to coat the film continuously with the solution of the water-soluble organic polymer; then the water is removed; and to form a final product, the coated semipermeable composite membrane is dried at a temperature of about 90° to 100° C. for about 5 to 10 minutes.

The membrane having permselectivity provided by this invention is very suitable as a permselective membrane for the applications to be described because it has superior salt rejection and flux properties, especially flux properties, superior flexibility, high resistance to compaction and high resistance to chemical and biological degradation, especially oxidation resistance and hydrolysis resistance.

The membrane of this invention can be advantageously used as a permselective membrane to separate and remove tiny amounts of contaminated molecules dispersed or dissolved in a liquid or gas, and can find extensive application, for example in the desalting of sea water and brackish water, and the treatment of industrial effluents containing organic matter, liquid containing mixture of organic substances, and waste waters from the food industry.

The membrane of this invention can be used especially advantageously as a reverse osmosis membrane in the method for desalination of saline or brackish water by reverse osmosis which comprises contacting the saline or brackish water under pressure with the reverse osmosis membrane. This method is known, and a specific procedure described, for example, in Ind. Eng. Chem. Found. 3, 206 (1964) can be used. Thus, the disclosure of this literature reference is incorporated herein by reference.

The following examples further illustrate the present invention.

REFERENTIAL EXAMPLE 1

Preparation of a fabric-reinforced microporous substrate:

A Dacron non-woven fabric (basis weight 180 g/m²) was fixed on a glass plate. Then, a solution containing 12.5% by weight of polysulfone, 12.5% by weight of methyl Cellosolve and the remainder being dimethyl formamide was cast onto the fabric in a layer having a thickness of about 200 micron. Immediately, the polysulfone layer was gelled in a room temperature water bath to form a non-woven fabric-reinforced microporous polysulfone membrane.

The resulting microporous polysulfone layer had a thickness of about 40 to 70 microns and had an anisotropic structure. By observation with an electron micrograph, the surface of the microporous layer was found to contain numerous micropores with a size of 50 to 600 Å.

The resulting microporous substrate had a pure water flux (membrane constant) of about 3.0 to $7.0 \times 10^{-2}$ g/cm².sec.atm.

REFERENTIAL EXAMPLE 2

Step I: Preparation of a Polymer (thermal radical polymerization):

A predetermined amount of a diallylamine salt and optionally sulfur dioxide and/or a comonomer in predetermined amounts were dissolved in dimethyl sulfoxide, and the solution was fed into a reactor. Ammonium persulfate was added in an amount of 1 to 5% based on the total amount of the monomers charged to the monomer solution. The reaction system was purged with nitrogen, and the contents were stirred for a predetermined period of time at 30° to 50° C. After the reaction, the solution was poured into a large amount of acetone to precipitate the resulting polymer. The polymer was washed with acetone two or three times, and dried under reduced pressure.

Step II: Deposition of the polymer on a substrate (method A):

The polymer obtained in Step I or in Referential Example 3 was dissolved in water or a lower alcohol in a predetermined concentration. A predetermined amount of a water-soluble basic compound was added to the solution to convert the recurring units

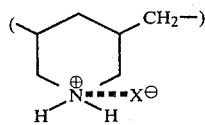

in the polymer wholly or partly into units

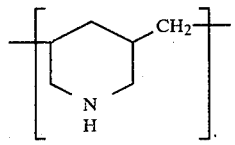

The solution was then coated on, or impregnated in, the polysulfone porous support obtained in Referential Example 1, and air dried for 10 to 20 minutes.

Step III: Preparation of a composite crosslinked membrane:

The non-crosslinked composite membrane obtained in Step II of Referential Example 2, or in Referential Example 4 was dipped at room temperature for 2 to 5 minutes in an n-hexane solution of a suitable crosslinking agent of a predetermined concentration. Then, the n-hexane adhering to the surface of the membrane was volatilized for 1 to 2 minutes, and the membrane was heat-treated at 100° to 120° C. for 10 minutes in a hot air dryer to obtain a crosslinked composite membrane.

REFERENTIAL EXAMPLE 3

Preparation of a polymer by photo-induced polymerization:

A predetermined amount of a diallylamine salt and optionally predetermined amounts of sulfur dioxide and/or a comonomer were mixed with less than 20%, based on the total weight of the monomers, of a solvent or a non-solvent. As required, a predetermined amount of a sensitizer was added to form a solution or slurry. The solution or slurry was cast onto a glass plate, and subjected to irradiation of light having wavelengths of 150 to 500 nm to obtain a solidified polymer mixture. The product was washed with a large amount of acetone, and dried under reduced pressure to obtain a purified polymer.

REFERENTIAL EXAMPLE 4

Deposition of the polymer on a substrate (method B):

The polymer obtained in Step I of Referential Example 2 or in Referential Example 3 was dissolved in water or a lower alcohol in a predetermined concentration. The resulting solution was coated on, or impregnated for 2 to 5 minutes in, the polysulfone porous substrate obtained in Referential Example 1, and air dried for 10 to 20 minutes. The resulting uncrosslinked composite membrane was dipped for a predetermined period of time in a solution of a water-soluble basic compound in a predetermined concentration to convert the recurring units

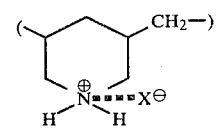

in the polymer constituting the membrane wholly or partly into units of the formula

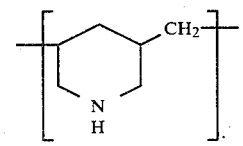

The membrane was then air dried for 10 to 20 minutes.

REFERENTIAL EXAMPLE 5

Test for chlorine resistance:

A. Dipping method

The crosslinked composite membrane obtained in Step III of Referential Example 2 was set in a reverse osmosis device having a flow-through cell. Using a 0.5% aqueous solution of sodium chloride, the device was operated for 1 hour at 25° C. and 42.5 kg/cm², and then the performance of the membrane in reverse osmosis was measured. Then, the composite membrane was removed from the reverse osmosis device, and dipped for a predetermined period of time in an aqueous solution having an active chlorine concentration of 4 to 5 ppm and a pH of 6.0 to 6.5. The pH and active chlorine concentration of the dipping solution were checked twice a day, and adjusted to the above ranges during the testing period. After dipping for the predetermined time, the performance of the composite membrane in reverse osmosis was again measured in the same way as above.

B. Dynamic method

The performance of the crosslinked composite membrane obtained in step III of Referential Example 2 was measured under the same conditions as in A above. Then chlorine was added to the test solution, and the active chlorine concentration of the solution and the pH of the solution were maintained at 4–5 ppm and 6.0–6.5, respectively. Under these oxidizing conditions, the reverse osmosis test was continued, and changes in the performance of the membrane in reverse osmosis were traced at prescribed time intervals. The active chlorine concentration and pH of the solution were cheked twice a day, and adjusted to the above ranges.

Reverse osmosis testing method

Reverse osmosis was carried out in an ordinary continuous pump-type reverse osmosis device using a 5000 ppm aqueous solution of sodium chloride or a 10,000 ppm aqueous solution of sodium chloride at a pH of 7.0 and a temperature of 25° C. The operating pressure was 42.5 kg/cm².G or 40 kg/cm².G.

Salt rejection

The salt rejection (%) is a value calculated from the following equation.

$$\text{Salt rejection (\%)} = \left(1 - \frac{\text{NaCl concentration in permeating water}}{\text{NaCl concentration in the test solution}}\right) \times 100$$

EXAMPLE 1

A semipermeable composite membrane was produced by the following procedure in accordance with the method of Referential Example 2, and subjected to a reverse osmosis test.

[I] A 300 cc three-necked flask equipped with a stirring rod, a thermometer and a reflux condenser was charged with 37.4 g of diallylamine hydrochloride, and 69.5 g of dimethyl sulfoxide was added to dissolve the monomer. The temperature was raised to 50° C., and then 0.75 g of ammonium persulfate was added as a catalyst. While stirring the mixture, the monomer was polymerized for 24 hours. The polymer solution was added to a large amount of acetone to precipitate the polymer. The precipitate was separated by filtration, and dried at 50° C. under reduced pressure to afford 15.0 g of a polymer.

The polymer had the following structural unit, and an inherent viscosity of 0.31 (dl/g) (0.5 wt.% of the polymer in a 1/10 N aqueous solution of NaCl at 30° C.).

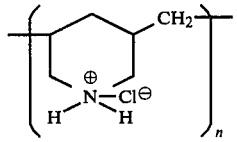

[II] The resulting polymer was dissolved in distilled water to form a 1% by weight aqueous solution of the polymer. Sodium hydroxide (0.6 g) was added to 100 g of the solution to form an aqueous solution of a polymer having the following structural unit.

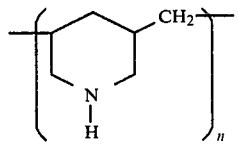

A porous supporting membrane (membrane constant $6.1 \times 10^{-2}$ g/cm².sec.atm.; the back side was reinforced with a polyethylene terephthalate non-woven fabric) of polysulfone (Udel-P3500, a registered trademark for a product of Union Carbide Corporation) was dipped for 2 minutes in the resulting aqueous solution, and air dried for 10 minutes.

[III] The resulting non-crosslinked composite membrane was dipped at room temperature for 2 minutes in a 0.5% by weight n-hexane solution of trimesoyl chloride.

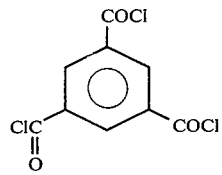

The n-hexane adhering to the surface of the membrane was volatilized, and immediately, the membrane was heat-treated in a drying oven at 115° to 120° C. for 10 minutes.

[IV] Reverse osmosis test

The composite membrane obtained was subjected to a reverse osmosis test at 25° C. and 42.5 kg/cm² using a 0.5% aqueous solution of sodium chloride as a test solution. One hour later, the membrane showed a water flux of 28.3 liters/m².hr and a salt rejection of 95.0%. At the end of 24 hours, the membrane showed a water flux of 26.1 liters/m².hr and a salt rejection of 96.7%.

Subsequently, sodium hypochlorite and a buffer were added to the test solution, and the test solution was maintained at a pH of 5.0 and a chlorine concentration of 5 to 6 ppm. The reverse osmosis test was continued. At the end of 100 hours, the membrane showed a water flux of 22.3 liters/m².hr and a salt rejection of 98.0%. At the end of another 100 hours, the membrane showed a water flux of 21.5 liters/m².hr and a salt rejection of 98.2%, showing great stability in performance.

During the testing period, sodium hypochlorite was added to the test solution to maintain its chlorine concentration always at 5 to 6 ppm (pH 5.0).

EXAMPLES 2 TO 5

Composite membranes were produced by the same producedure as in Example 1 except that each of the acid acceptors and crosslinking agents as indicated in Table 1 were used. The membranes were subjected to a reverse osmosis test. The properties of the membranes after one hour (to be referred to as initial properties) and chlorine resistance of these membranes were measured. The results are shown in Table 1.

Table 1

| Example | Acid Acceptor (amount) | Crosslinking agent (wt. %) | Initial properties | | Chlorine Resistance Test Dipping Method (45 hrs.) | |
|---|---|---|---|---|---|---|
| | | | W.F. | S.R. | W.F. | S.R. |
| 2 | NaOH (0.1 g) | IPC/TMC (5:1) (0.5 wt.%) | 34.4 | 91.3 | 41.5 | 94.2 |

Table 1-continued

| Example | Acid Acceptor (amount) | Crosslinking agent (wt. %) | Initial properties W.F. | Initial properties S.R. | Chlorine Resistance Test Dipping Method (45 hrs.) W.F. | Chlorine Resistance Test Dipping Method (45 hrs.) S.R. |
|---|---|---|---|---|---|---|
| 3 | 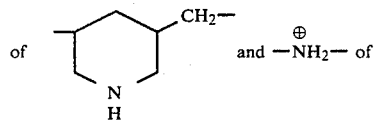 (0.5 g) | TMC (0.5 wt.%) | 79.5 | 81.2 | 90.7 | 88.7 |
| 4 | '' | IPC/TMC (5:1) (0.5 wt.%) | 37.8 | 91.1 | 39.3 | 94.1 |
| 5 | 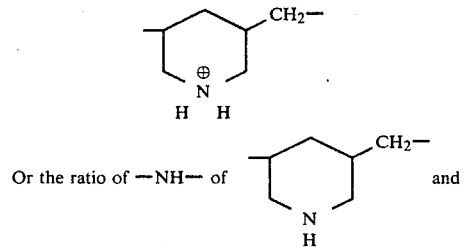 | IPC (0.5 wt.%) | 29.5 | 90.4 | 32.4 | 93.3 |

Note
W.F.: water flux (liters/m$^2$ . hr)
S.R.: Salt rejection (%)
IPC: Isophthaloyl chloride
TMC: Trimesoyl chloride
IPC/TMC (5:1): A mixture of IPC and TMC in a weight ratio of 5:1

When piperazine was used as a dehydrochlorinating agent, the diallylamine salt contained in the polymer was wholly or partly dehydrochlorinated to give the recurring unit (I) in accordance with this invention. The structure of the dehydrochlorinated polymer was determined as follows:

Piperazine was added to the polymer, and dehydrochlorination reaction was performed for a predetermined period of time (usually, 1 to 2 hours). The reaction mixture was purified by dialysis, and then concentrated. The polymer obtained was dissolved in deuterodimethylsulfoxide or D$_2$O, and subjected to measurement of proton NMR. Thus, the structure was determined from the ratio between —NH—

—NH$_2$— of 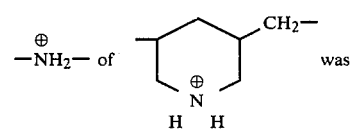 was determined by N$^{15}$ NMR. Simultaneously, by elemental analysis, the proportions of the other components were determined.

EXAMPLES 6 TO 9

[I] In the same way as in [I] of Example, polymerization was carried out except that 44.9 g of diallylamine nitrate was used instead of 37.4 g of diallylamine hydrochloride. Thus, a polymer having the following structure and an inherent viscosity, of 0.89 (dl/g) (0.5 wt % of the polymer in a 1/10 N aqueous solution of NaCl) was obtained.

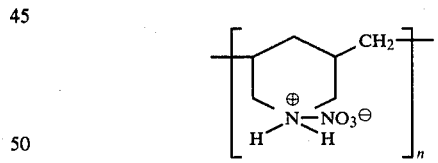

[II] Composite membranes were prepared by the same procedure as in [II] to [IV] of Example 1 using the resulting polymer and each of the acid acceptors and crosslinking agents shown in Table 2. These membranes were subjected to a reverse osmosis test and a chlorine resistance test. The results obtained are shown in Table 2.

Table 2

| Example | Acid Acceptor (amount) | Crosslinking agent (wt.%) | Initial properties W.F. | Initial properties S.R. | Chlorine Resistance Test Dipping Method (45 hrs.) W.F. | Chlorine Resistance Test Dipping Method (45 hrs.) S.R. |
|---|---|---|---|---|---|---|
| 6 | NaOH (0.1 g) | IPC/TMC (5:1) (0.7 wt.%) | 28.2 | 91.7 | 29.7 | 92.5 |
| 7 | NaOH (0.1 g) | TMC (0.7 wt.%) | 57.3 | 84.9 | 60.8 | 87.3 |

Table 2-continued

| Example | Acid Acceptor (amount) | Crosslinking agent (wt.%) | Initial properties W.F. | Initial properties S.R. | Chlorine Resistance Test Dipping Method (45 hrs.) W.F. | Chlorine Resistance Test Dipping Method (45 hrs.) S.R. |
|---|---|---|---|---|---|---|
| 8 | 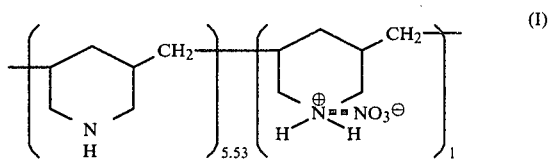 (0.5 g) | IPC/TMP (5:1) (0.7 wt.%) | 67.4 | 86.3 | 46.7 | 93.2 |
| 9 | " | TMC (0.7 wt.%) | 88.1 | 85.2 | 74.8 | 90.1 |

When piperazine was used as a denitrating agent, the resulting polymer had the following structure [I].

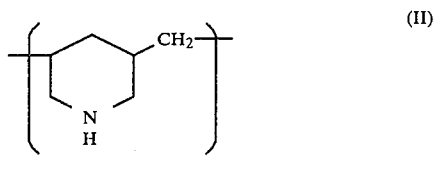

When NaOH was used as a denitrating agent, the resulting polymer had the following structure [II].

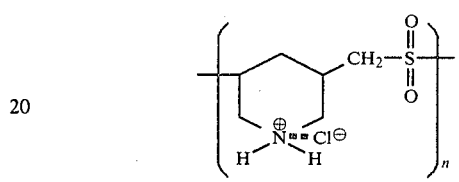

[II] 0.5 g of piperazine was added to 100 g of a 1% by weight aqueous solution of the polymer. The mixture was stirred at 50° C. for 30 minutes to form an aqueous solution of a polymer having the following structure.

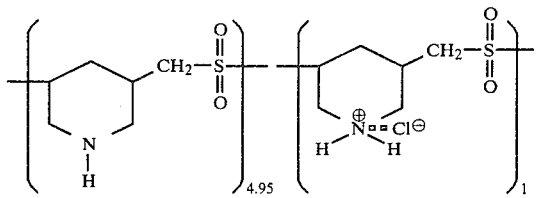

EXAMPLES 10 TO 13

[I] Diallylamine hydrochloride (6.7 g) and 3.2 g of sulfur dioxide were dissolved in 30 g of dimethyl sulfoxide, and at 50° C., the mixture was reacted for 5 hours using 0.2 g of ammonium persulfate as a catalyst. The reaction mixture obtained was added to a large amount of acetone to precipitate the resulting polymer. The polymer was separated by filtration, and dried at 50° C. under reduced pressure to afford 5.8 g of a polymer having an inherent viscosity of (0.5 wt% of the polymer in a 1/10 N aqueous solution of NaCl at 30° C.) of 1.21 (dl/g). The polymer had the following structure.

The polysulfone porous substrate obtained in Referential Example 1 was dipped for 5 minutes in the resulting aqueous polymer solution, and then air dried for 10 minutes.

[III] The non-crosslinked composite membrane was crosslinked in the same way as in Example 1 using each of the crosslinking agents shown in Table 3. The crosslinked membranes were subjected to a reverse osmosis test in the same way as in Example 1. The results are shown in Table 3.

Table 3

| Example | Crosslinking agent (wt. %) | Initial properties W.F. | Initial properties S.R. | Chlorine Resistance Test Dipping Method (50 hrs.) W.F. | Chlorine Resistance Test Dipping Method (50 hrs.) S.R. |
|---|---|---|---|---|---|
| 10 | IPC | 23.5 | 94.6 | 23.4 | 96.9 |
| 11 | TMC | 36.0 | 89.2 | 84.5 | 93.1 |
| 12 | IPC/TMC | 139.7 | 88.6 | 92.1 | 86.2 |
| 13-1 | TPC | 13.3 | 95.8 | 15.9 | 96.6 |
| | (ClC—⟨O⟩—COCl) | | | | |
| 13-2* | " | 47.1 | 96.7 | 54.3 | 96.5 |

*NH₃ was added as a dehydrochlorinating agent instead of NaOH in an amount of 0.04 g to 100 g of the 1% by weight aqueous solution of the polymer.

EXAMPLES 14 to 41

[I] In the same way as in Example 1, each of the comonomers shown in Table 4 was used in addition to 37.4 g of diallylamine hydrochloride to form polymers.

The structures and inherent viscosities (determined at 30° C. in 1/10 N NaCl in a concentration of 0.5 g/100 ml) of these polymers are shown in Table 4.

[II] Each of the resulting polymers was dissolved in distilled water, dehydrochlorinated completely with sodium hydroxide, and purified by dialysis. A 1% by weight aqueous solution of the polymer was prepared, and each of the dehydrochlorinating agents shown in Table 4 (to neutralize hydrogen chloride generated at the time of crosslinking) was added to 100 g of the solution. Non-crosslinked composite membranes were prepared by using the resulting solution.

[III] The resulting non-crosslinked composite membranes were each crosslinked using an n-hexane solution of each of the crosslinking agents shown in Table 4 to form crosslinked composite membranes.

[IV] These crosslinked composite membranes were tested in the same way as in [IV] of Example 1. The results are shown in Table 4.

Table 4

| Example No. | Monomer (g) Diallylamine hydrochloride | Monomer (g) Comonomer | SO₂ | Polymer Structure | Inherent viscosity | Acid acceptor (g) | Cross-linking agent (%) | Initial properties of membrane W.F. | Initial properties of membrane S.R. | Dipping test (*) W.F. | Dipping test (*) S.R. |
|---|---|---|---|---|---|---|---|---|---|---|---|
| 14 | diallylamine·HCl (13.4) | [allyl₂NMe₂]⁺Cl⁻ (4.0) | — | copolymer structure (3.91 : 1) | 0.21 | NaOH (0.18) | IPC (0.7) | 52.9 | 90.3 | 84.2 | 92.8 |
| 15 | " | " | — | " | 0.21 | piperazine (0.38) | " | | | 123.9 | 97.1 |
| 16 | " | [allyl₂NMe₂]⁺Cl⁻ (8.0) | — | copolymer (1.79 : 1) | 0.33 | piperazine (0.39) | " | 97.3 | 95.2 | | |
| | | | | | | | | 83.5 | 90.1 | 111.4 | 91.2 |
| 17 | diallylamine·HCl (10.0) | [allyl₂NMe₂]⁺Cl⁻ (8.1) | — | copolymer (1.15 : 1) | 0.42 | piperazine (0.32) | " | 121.4 | 88.4 | 135.7 | 90.3 |
| 18 | " | " | — | " | 0.42 | " | TOMC (**) (0.7) | 81.4 | 89.3 | 103.2 | 91.9 |
| 19 | " | " | — | " | 0.42 | " | DNCFP (*4) (0.5) | 44.8 | 93.7 | 59.8 | 94.6 |

Table 4-continued

| Example No. | Monomer (g) Diallylamine hydrochloride | Comonomer | SO$_2$ | Polymer Structure | Inherent viscosity | Acid acceptor (g) | Cross-linking agent (%) | Initial properties of membrane W.F. | S.R. | Dipping test (*) W.F. | S.R. |
|---|---|---|---|---|---|---|---|---|---|---|---|
| 20 | ⊕NH$_2$ Cl⊖ diallylammonium chloride (13.4) | ⊕NMe$_2$ Cl⊖ diallyldimethylammonium (4.0) | SO$_2$ (8.5) | copolymer with CH$_2$-SO$_2$ units, ratio 1 : 3.87 | 0.87 | piperazine (0.34) | IPC/TMC (0.5) | 75.6 | 85.3 | 72.8 | 90.0 |
| 21 | " | " | " | " | 0.87 | " | TMC (0.7) | 57.1 | 93.5 | 71.3 | 95.4 |
| 22 | N-allyl-N-methyl acetamide (4.1) | | SO$_2$ (6.8) | copolymer ratio 1 : 2.91 | 0.9 | piperazine (0.32) | IPC (0.7) | 47.8 | 92.7 | 51.5 | 93.1 |
| 23 | " | " | " | " | 0.9 | " | -CSIPC (*4) (0.7) | 79.3 | 87.5 | 77.3 | 90.5 |
| 24 | " | (16.2) | SO$_2$ (17.0) | copolymer ratio 1 : 1.23 | 1.15 | " | IPC (0.7) | 69.8 | 85.3 | 81.4 | 87.9 |
| 25 | (20.0) | " | " | " | 1.15 | " | IPC/TMC (0.5) | 101.4 | 81.4 | 119.7 | 84.0 |

Table 4-continued

| Example No. | Monomer (g) Diallylamine hydrochloride | Monomer (g) Comonomer | Monomer (g) SO$_2$ | Polymer Structure | Polymer Inherent viscosity | Acid acceptor (g) | Cross-linking agent (%) | Initial properties of membrane W.F. | Initial properties of membrane S.R. | Dipping test (*) W.F. | Dipping test (*) S.R. |
|---|---|---|---|---|---|---|---|---|---|---|---|
| 26 | (20.0) | N-CO-OC$_2$H$_5$ diallyl carbamate (8.5) | SO$_2$ (13.6) | [copolymer structure with CH$_2$-SO$_2$ and N-COOC$_2$H$_5$ groups], 3.13 / 1 | 0.73 | piperazine (0.32) | IPC (0.7) | 36.0 | 91.4 | 51.4 | 91.8 |
| 27 | (7.3) | diallyl ethyl malonate COOC$_2$H$_5$ (2.3) | SO$_2$ (4.4) | [copolymer structure with COOC$_2$H$_5$ groups], 5.31 / 1 | 0.37 | piperazine (0.34) | " | 32.7 | 89.1 | 53.2 | 93.6 |
| 28 | " | diallyl ether (2.0) | SO$_2$ " | [copolymer structure with O], 4.83 / 1 | 0.37 | NaOH (0.16) | " | 23.2 | 87.6 | 31.4 | 90.9 |
| 29 | (13.4) | diallyl ether (2.0) | SO$_2$ (8.2) | [copolymer structure with O], 4.83 / 1 | 0.41 | piperazine (0.31) | IPC/TMC (0.7) | 63.3 | 84.8 | 69.5 | 87.5 |
| 30 | (13.4) | (2.0) | SO$_2$ (8.2) | [copolymer structure with O], 4.83 / 1 | 0.41 | " | TPC (*5) (0.7) | 28.8 | 87.7 | 56.9 | 89.3 |

Table 4-continued

| Example No. | Monomer (g) Diallylamine hydrochloride | Monomer (g) Comonomer | $SO_2$ | Polymer Structure | Inherent viscosity | Acid acceptor (g) | Cross-linking agent (%) | Initial properties of membrane W.F. | S.R. | Dipping test (*) W.F. | S.R. |
|---|---|---|---|---|---|---|---|---|---|---|---|
| 31 | diallylammonium chloride (26.7) | $CH_2\!=\!CH\!-\!COOCH_3$ (0.9) | — | [piperidinium Cl⁻ —CH₂—]₂₀.₃₇ / [—CH₂—CH(COOCH₃)—] | 0.17 | piperazine (0.63) | IPC (0.7) | 73.5 | 91.4 | 89.0 | 93.2 |
| 32 | " | $CH_2\!=\!CH\!-\!COOCH_3$ (1.8) | — | " | 0.17 | " | IPC/TMC (0.7) | 133.2 | 90.9 | 156.5 | 92.8 |
| 33 | " | $CH_2\!=\!CH\!-\!COOCH_3$ (2.7) | — | [piperidinium Cl⁻ —CH₂—]₁₀.₃₂ / [—CH₂—CH(COOCH₃)—] | 0.22 | " | IPC (0.7) | 90.2 | 88.2 | 64.9 | 95.6 |
| 34 | " | $CH_2\!=\!CH\!-\!COOCH_3$ | $SO_2$ (14.4) | [piperidinium Cl⁻ —CH₂—SO₂—]₇.₀₃ / [—CH₂—CH(COOCH₃)—]₁ | 0.75 | piperazine (0.41) | IPC/TMC (0.7) | 128.8 | 91.1 | 168.7 | 93.8 |
| 35 | diallylammonium chloride (12.0) | $CH_2\!=\!CH\!-\!CO\!-\!N(C_2H_5)_2$ (2.8) | $SO_2$ (7.5) | [piperidinium Cl⁻ —CH₂—SO₂—]₄.₃₇ / [—CH₂—CH—CO—N(C₂H₅)₂]₁ | 0.19 | piperazine (0.38) | " | 65.9 | 92.3 | 73.4 | 94.0 |

Table 4-continued

| Example No. | Monomer (g) Diallylamine hydrochloride | Comonomer | SO$_2$ | Polymer Structure | Inherent viscosity | Acid acceptor (g) | Cross-linking agent (%) | Initial properties of membrane W.F. | S.R. | Dipping test (*) W.F. | S.R. |
|---|---|---|---|---|---|---|---|---|---|---|---|
| 36 | (7.3) | CH$_2$=CH—COOC$_4$H$_9$ (1.3) | SO$_2$ (4.1) | [—CH$_2$—SO$_2$—(piperidinium Cl$^\ominus$)—]$_{5.17}$[—CH$_2$—CH(COOC$_4$H$_9$)—]$_1$ | 0.43 | piperazine (0.46) | " | 113.0 | 83.8 | 148.2 | 94.7 |
| 37 | (6.7) | CH$_2$=C(CH$_3$)—COOCH$_2$CHCH$_2$Cl (1.8) | SO$_2$ (4.1) | [—CH$_2$—SO$_2$—(piperidinium Cl$^\ominus$)—]$_{4.94}$[—CH$_2$—C(CH$_3$)(C(=O)O—CH$_2$CHCH$_2$Cl/OH)—]$_1$ | 0.24 | piperazine (0.37) | " | 102.7 | 85.5 | 121.1 | 93.3 |
| 38 | (10.0) | CH$_2$=CHCN (0.5) | SO$_2$ (5.8) | [—CH$_2$—SO$_2$—(piperidinium Cl$^\ominus$)—]$_{7.08}$[—CH$_2$—CH(CN)—]$_1$ | 0.21 | piperazine (0.42) | " | 71.6 | 91.6 | 90.9 | 93.4 |
| 39 | (13.4) | allyl-N(CH$_3$)(CH$_2$CH=CH$_2$)$_2$ Cl$^\ominus$ | SO$_2$ (7.5) | [—CH$_2$—SO$_2$—(piperidinium Cl$^\ominus$)—]$_{9.37}$[—CH$_2$—SO$_2$—CH$_2$—N$^\oplus$(CH$_3$)(CH$_2$CH=CH$_2$) Cl$^\ominus$—]$_1$ | 0.94 | piperazine (0.39) | " | 54.4 | 83.0 | 57.0 | 92.1 |

Table 4-continued

| Example No. | Monomer (g) Diallylamine hydrochloride | Monomer (g) Comonomer | Monomer (g) SO₂ | Polymer Structure | Polymer Inherent viscosity | Acid acceptor (g) | Cross-linking agent (%) | Initial properties of membrane W.F. | Initial properties of membrane S.R. | Dipping test (*) W.F. | Dipping test (*) S.R. |
|---|---|---|---|---|---|---|---|---|---|---|---|
| 40 | ![diallylamine HCl] (10.7) | ![dimethylsulfonium comonomer] (1.8) | SO₂ (6.1) | [structure with two repeat units, 7.89 and 1] | 0.37 | " | " | 103.1 | 80.6 | 137.5 | 86.2 |
| 41 | ![diallylamine HCl] (8.7) | CH₂=CH–N(piperidinone) (1.1) | SO₂ (5.1) | [structure with two repeat units, 6.19 and 1] | 0.29 | 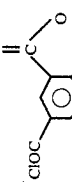 piperazine (0.40) | " | 49.5 | 88.4 | 61.3 | 90.2 |

Notes to Table 4

(*) Dipped for 45 days at room temperature in a solution having a chlorine concentration of 5 ppm and a pH of 6 to 6.5.
(**) TOMC is a compound of the following formula.

(*3) DNCFP is a compound of the following formula.

ClOC—N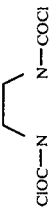N—COCl (*4) 3-CSIPC is a compound of the following formula.

(*5) TPC is a compound of the following formula.

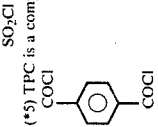

EXAMPLE 42

[I] Diallylamine hydrochloride (26.7 g), 8.1 g of N,N-dimethyldiallylamine hydrochloride and 17.0 g of sulfur dioxide were dissolved in 170 g of dimethylsulfoxide. The solution was reacted at 50° C. for 5 hours using 1.0 g of ammonium persulfate as a catalyst. The resulting reaction mixture was added to a large amount of acetone to precipitate the polymer. The polymer was separated by filtration, and dried at 50° C. under reduced pressure to afford 46.1 g of a polymer having an inherent viscosity of 0.87 (dl/g) (0.5 wt % of the polymer in a 1/10 N aqueous solution of sodium chloride at 30° C.). The polymer had the following structure.

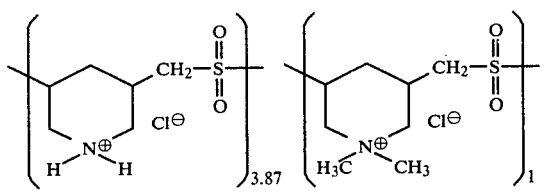

[II] The resulting polymer was dissolved in distilled water, dehydrochlorinated completely with sodium hydroxide, and purified by dialysis. The purified polymer was again dissolved in distilled water to form a 1% by weight aqueous solution of the polymer. To 100 g of the solution were added 0.34 g of piperazine. They were mixed well at room temperature. The polysulfone porous substrate obtained in Example 1 was dipped for 2 minutes in the resulting solution, and dried in the air for 10 minutes to form a non-crosslinked composite membrane.

[III] The resulting non-crosslinked composite membrane was dipped at room temperature for 2 minutes in a 0.5% by weight n-hexane solution of a mixture of isophthaloyl chloride and trimesoyl chloride in a weight ratio of 5:1. The n-hexane adhering to the surface of the membrane was volatilized, and immediately then, the membrane was heat-treated for 10 minutes at 115° to 120° C. in a drying oven.

[IV] Each of the composite membranes so obtained was subjected to the same reverse osmosis test as in Example 1. The properties of the membranes showed the changes with time as shown in Table 5, and it was seen that these membranes had good durability.

Table 5

| Time elapsed (hours) | 1 | 50 | 80 |
|---|---|---|---|
| W. F. (l/m².hr) | 73.5 | 71.1 | 69.8 |
| S. R. (%) | 94.2 | 94.9 | 95.1 |

EXAMPLES 43 to 63

In the same way as in Example 42, various composite membranes are formed. These membranes were tested for chlorine resistance by subjecting them to a reverse osmosis test continuously. The results are shown in Table 6.

Table 6

| Example | Structure of Polymer | Acid acceptor | Crosslinking agent (wt.%) | Initial properties W.F. | Initial properties S.R. | Properties after the chlorine resistance test (*2) W.F. | Properties after the chlorine resistance test (*2) S.R. | Total operating time elapsed (hours) |
|---|---|---|---|---|---|---|---|---|
| 43 | piperidine-CH₂ repeat unit | piperazine (0.89) | TPC (0.7) | 34.0 | 89.7 | 32.8 | 92.5 | 40 |
| 44 | " | NaOH (0.44) | TPC (0.7) | 39.6 | 90.5 | 40.1 | 91.1 | 40 |
| 45 | sulfonyl-CH₂-piperidine copolymer (*1) | piperazine (1.10) | TPC/TMC (5/1) (0.7) | 61.3 | 93.4 | 55.9 | 93.6 | 80 |
| 46 | " | " | IPC/TMC (5/1) (0.7) | 48.2 | 92.0 | 44.7 | 92.8 | 80 |
| 47 | quaternary ammonium/sulfonyl copolymer structure | piperazine (0.42) | 3CSIPC (0.7) | 127.5 | 91.3 | 96.4 | 94.9 | 70 |
| 48 | " | " | ClC(O)(CH₂)₄COCl (0.7) | 112.8 | 82.1 | 107.3 | 84.2 | 40 |
| 49 | " | " | cyclohexane-1,4-dicarbonyl dichloride (0.7) | 96.1 | 85.9 | 81.4 | 86.8 | 40 |

Table 6-continued

| Example | Structure of Polymer | Acid acceptor | Crosslinking agent (wt.%) | Initial properties W.F. | Initial properties S.R. | Properties after the chlorine resistance test (*2) W.F. | Properties after the chlorine resistance test (*2) S.R. | Total operating time elapsed (hours) |
|---|---|---|---|---|---|---|---|---|
| 50 | $\left[\begin{array}{c}\text{CH}_2\text{-piperidine-SO}_2\end{array}\right]_{7.03} \left[\begin{array}{c}\text{CH}_2\text{CH} \\ \text{COOCH}_3\end{array}\right]_1$ | piperazine (0.50) | IPC (0.7) | 87.4 | 88.8 | 64.5 | 89.0 | 70 |
| 51 | " | " | TMC (0.7) | 107.0 | 91.2 | 95.0 | 93.4 | 60 |
| 52 | " | " | 1,4-cyclohexane-(COCl)$_2$ (0.7) | 110.5 | 92.1 | 103.1 | 95.0 | 40 |
| 53 | $\left[\begin{array}{c}\text{CH}_2\text{-piperidine-SO}_2\end{array}\right]_{2.5} \left[\begin{array}{c}\text{CH}_2\text{CH} \\ \text{O=C-N(C}_2\text{H}_5)_2\end{array}\right]_1$ | piperazine (0.45) | IPC (0.7) | 29.7 | 93.7 | 25.8 | 96.3 | 40 |
| 54 | $\left[\begin{array}{c}\text{CH}_2\text{-(N-COOC}_2\text{H}_5\text{)piperidine-SO}_2\end{array}\right]_{3.13} \left[\begin{array}{c}\text{SO}_2\end{array}\right]_1$ | piperazine (0.32) | IPC/TMC (5/1) (0.7) | 57.0 | 90.8 | 49.1 | 93.6 | 80 |
| 55 | " | " | ClOC·CH$_2$OCH$_2$·COCl (0.7) | 41.9 | 82.3 | 37.4 | 84.0 | 80 |

Table 6-continued

| Example | Structure of Polymer | Acid acceptor | Crosslinking agent (wt.%) | Initial properties W.F. | Initial properties S.R. | Properties after the chlorine resistance test (*2) W.F. | Properties after the chlorine resistance test (*2) S.R. | Total operating time elapsed (hours) |
|---|---|---|---|---|---|---|---|---|
| 56 | [polymer with SO$_2$, piperidine NH, and -CH$_2$-CH-CN side group]$_{7.08}$ | piperazine (HN-NH) (0.42) | IPC (0.7) | 53.4 | 94.7 | 49.0 | 97.1 | 80 |
| 57 | [polymer with SO$_2$, piperidine NH, and CH$_2$-tetrahydropyran-O side group]$_{4.83}$ | piperazine (0.37) | ClOC·CH$_2$OCH$_2$·COCl (0.7) | 68.3 | 81.1 | 60.8 | 82.2 | 80 |
| 58 | " | " | TPC/TMC (5/1) (0.7) | 119.5 | 85.9 | 101.5 | 89.7 | 70 |
| 59 | [polymer with SO$_2$, piperidine NH, and bicyclic SO$_2$ side group]$_{9.34}$ (*1) | piperazine (0.40) | 3CSIPC (0.7) | 130.8 | 87.2 | 114.2 | 90.5 | 70 |
| 60 | " | " | TPC (0.7) | 44.1 | 95.0 | 38.6 | 98.4 | 70 |
| 61 | [polymer with SO$_2$, piperidine NH, and cyclohexyl SO$_2$ side group]$_{12.72}$ (*1) | piperazine (0.41) | TPC (007) | 37.2 | 93.4 | 33.7 | 95.8 | 70 |
| 62 | " | " | TPC (0.7) | 50.6 | 91.5 | 44.0 | 93.9 | 70 |
| 63 | " | " | TPC (0.7) | 68.3 | 90.6 | 61.1 | 92.0 | 70 |

Note to Table 6
(*1) The was used in the form of an aqueous emulsion in producing the composite membrane.
(*2) The reverse osmosis test was conducted at 25° C. and 42.5 kg/cm$^2$ using a 0.5% aqueous solution of sodium chloride having a Cl$_2$ concentration of 5 ppm and a pH of 6.0 to 6.5.

EXAMPLES 64 to 73

In the same way as in Example 1, crosslinked composite membranes were produced using the crosslinking agents shown in Table 7. The properties of these membranes in reverse osmosis were determined, and the results are shown in Table 7.

Table 7

| Example | Structure of polymer | Acid acceptor (g) | Crosslinking agent (wt. %) | Membrane properties W.F. | S.R. |
|---|---|---|---|---|---|
| 64 | (3-methyl-5-(CH₂–)piperidine, NH) | piperazine (HN–NH) (0.9) | 5-SO₂Cl-benzene-1,3-dicarbonyl chloride (ClOC–C₆H₃–COCl) (0.7) | 54.2 | 91.1 |
| 65 | " | NaOH (0.4) | ClC(O)–N(piperidine)–NCOCl (0.5) | 33.7 | 87.4 |
| 66 | " | — | OCN–(CH₃-cyclohexyl)–NCO (0.5) | 35.0 | 99.7 |
| 67 | {[piperidine-NH–CH₂–]–SO₂–CH=–[piperidine-N⁺(CH₃)₂ Cl⁻]–CH₂–SO₂–}₃.₈₇ | — | " | 87.3 | 96.9 |
| 68 | {[piperidine-NH–CH₂–]–SO₂–[piperidine-N⁺(CH₃)₂ Cl⁻]–CH₂–SO₂–}₃.₈₇ | piperazine (HN–NH) (0.4) | trimellitic anhydride acid chloride (0.5) | 71.4 | 90.3 |
| 69 | " | " | ClOC–O–C₆H₄–O–COCl (0.5) | 31.9 | 93.6 |
| 70 | {[piperidine-NH–CH₂–]–SO₂–CH₂–CH(COOCH₃)–}₇.₀₃ | — | OCN–(CH₃-C₆H₃)–NCO (0.7) | 77.8 | 98.8 |
| 71 | " | NaOH (0.3) | ClCN(O)–(CH₃-piperidine-CH₃)–NCOCl (0.5) | 48.2 | 85.3 |

Table 7-continued

| Example | Structure of polymer | Acid acceptor (g) | Crosslinking agent (wt. %) | Membrane properties W.F. | S.R. |
|---|---|---|---|---|---|
| 72 | 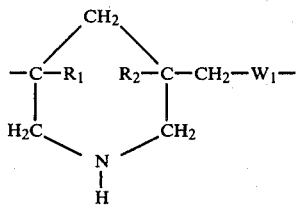 7.08 | — | (0.5) | 63.8 | 89.1 |
| 73 | " | — |  (0.5) | 41.0 | 98.7 |

(*)Tested at 25° C. and 42.5 kg/cm² using a 0.5% aqueous solution of sodium chloride.

What we claim is:

1. A semipermeable composite membrane comprising a microporous substrate and a thin semipermeable film of a polymeric material deposited on one side of the substrate, said thin semipermeable film being prepared by interfacial crosslinking of a polymer containing a recurring unit of the formula $$-\underset{H_2C}{\overset{CH_2}{\diagdown}}\underset{\diagdown}{\overset{\diagup}{C}}-R_1 \quad R_2-\underset{\diagdown}{\overset{\diagup}{C}}-CH_2-W_1- \atop \underset{H}{\overset{N}{|}}$$ (I)

wherein each of $R_1$ and $R_2$ represents a hydrogen atom or a methyl group, and $W_1$ represents a direct bonding or a sulfonyl group ($-SO_2-$), with a polyfunctional compound containing at least two functional groups selected from acid halide, sulfonyl halide, isocyanate, N-haloformyl, haloformate and acid anhydride groups.

2. The membrane of claim 1 wherein said polymer has a solubility of at least 0.2 g at 25° C. in 100 g of water or a water-miscible polar organic solvent.

3. The membrane of claim 1 wherein said polymer has a solubility of at least 0.5 g at 25° C. in 100 g of water or a water-miscible polar organic solvent.

4. The membrane of claim 2 or 3 wherein said organic solvent is selected from the group consisting of lower alcohols, formic acid, dimethylformamide, dimethylsulfoxide, tetramethylenesulfone and N-methylpyrrolidone.

5. The membrane of claim 1 wherein said polymer has an inherent viscosity, determined at 30° C. in formic acid with 0.5% by wt. of the polymer solution, of at least 0.1 dl/g.

6. The membrane of claim 1 wherein said polymer has an inherent viscosity, determined at 30° C. in formic acid with 0.5% by wt. of the polymer solution, of 0.2 to 2.0 dl/g.

7. The membrane of claim 1 wherein $R_1$ and $R_2$ in formula (I) are hydrogen atoms.

8. The membrane of claim 1 wherein said polymer contains the recurring unit of formula (I) in a proportion of at least 50 mole%.

9. The membrane of claim 1 wherein said polymer is a substantially linear polymer containing at least 60 mole% of the recurring unit of formula (I).

10. The membrane of claim 1 wherein said polymer is a polymer consisting essentially of the recurring unit (I) alone.

11. The membrane of claim 1 wherein said polymer is a copolymer composed of the recurring unit of formula (I) and at least one other recurring unit derived from a radical polymerizable monomer.

12. The membrane of claim 11 wherein said radical polymerizable monomer is a compound containing one or two ethylenically unsaturated bonds.

13. The membrane of claim 12 wherein said compound containing one or two ethylenically unsaturated bonds contains 2 to 10 carbon atoms.

14. The membrane of claim 12 wherein said compound containing one or two ethylenically unsaturated bonds has a molecular weight of 28 to 300.

15. The membrane of claim 12 wherein said compound containing one or two ethylenically unsaturated bonds has a solubility of at least 0.5 g at 25° C. in 100 g of water or a lower alcohol.

16. The membrane of claim 12 wherein said compound containing one or two ethylenically unsaturated bonds is ($a_1$) a compound of the following formula $$\underset{Y_2}{\overset{Y_1}{\diagdown}}C=C\underset{\diagdown Y_4}{\overset{\diagup Y_3}{}}$$ (II)

wherein $Y_1$, $Y_2$, $Y_3$ and $Y_4$, independently from each other, represent a hydrogen atom, a halogen atom, a cyano group, a carboxyl group, a sulfonic acid group, a sulfonate group, a 2-oxopyrrolidinyl group or a group of the formula $-R_3$, $-COOR_3$, $-OCOR_3$, $-COR_3$ or

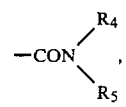

in which $R_3$ represents a monovalent hydrocarbon group having 1 to 10 carbon atoms which may optionally contain 1 to 5 hetero atoms selected from halogen, oxygen, sulfur and nitrogen atoms, and R$_4$ and R$_5$, independently from each other, represent a hydrogen atom or a monovalent hydrocarbon group containing 1 to 10 carbon atoms which may optionally contain 1 to 3 hetero atoms selected from oxygen, sulfur and nitrogen atoms, or taken together, may form a 5- or 6-membered heterocyclic ring together with the nitrogen atom to which they are bonded, which heterocyclic ring may optionally contain 1 or 2 hetero atoms selected from oxygen, sulfur and nitrogen atoms; and at least two of Y$_1$, Y$_2$, Y$_3$ and Y$_4$, taken together, may represent the group

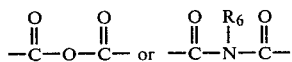

in which R$_6$ represents a hydrocarbon group containing 1 to 10 carbon atoms, or may form a cycloolefin ring containing 5 to 8 carbon atoms together with the carbon-carbon double bond to which the two groups are bonded; with the proviso that each of Y$_1$, Y$_2$, Y$_3$ and Y$_4$ does not have an ethylenic double bond; or (b$_1$) a compound of the following formula

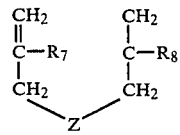

wherein each of R$_7$ and R$_8$ represents a hydrogen atom or a methyl group; Z represents a group of the formula

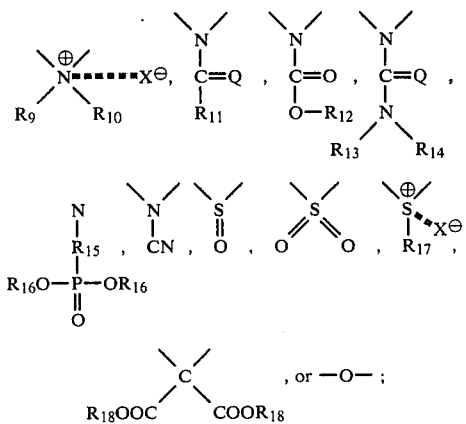

in which R$_9$ and R$_{10}$, independently from each other, represent a hydrogen atom, a substituted or unsubstituted alkyl group containing 1 to 10 carbon atoms, a lower alkenyl group, a cycloalkyl group containing 5 or 6 carbon atoms, a substituted or unsubstituted phenyl group or a substituted or unsubstituted phenyl-lower alkyl group, or R$_9$ and R$_{10}$, together, may form a 5- or 6-membered heterocyclic ring together with the nitrogen atom to which they are bonded, which heterocyclic ring may optionally contain 1 or 2 hetero atoms selected from oxygen, sulfur and nitrogen atoms; R$_{11}$ represents a hydrogen atom, a substituted or unsubstituted alkyl group containing 1 to 10 carbon atoms, a substituted or unsubstituted phenyl group, a substituted or unsubstituted phenyl-lower alkyl group, or a group of the formula

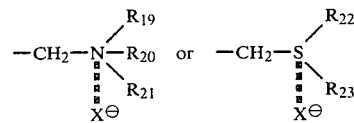

in which R$_{19}$, R$_{20}$ and R$_{21}$, independently from each other, represent a hydrogen atom, a substituted or unsubstituted lower alkyl group, or a substituted or unsubstituted phenyllower alkyl group, or two of R$_{19}$, R$_{20}$ and R$_{21}$, taken together, may form a 5- or 6-membered heterocyclic ring together with the nitrogen atom to which they are bonded, which heterocyclic ring may optionally contain 1 or 2 hetero atoms selected from oxygen, sulfur and nitrogen atoms, or R$_{19}$, R$_{20}$ and R$_{21}$, taken together with the nitrogen atom to which they are bonded, may form a substituted or unsubstituted pyridine ring, and R$_{22}$ and R$_{23}$, independently from each other, represent a substituted or unsubstituted alkyl group containing 1 to 3 carbon atoms; R$_{12}$ represents an alkyl group containing 1 to 10 carbon atoms, a substituted or unsubstituted phenyl group, or a substituted or unsubstituted phenyllower alkyl group; R$_{13}$ and R$_{14}$, independently from each other, represent a hydrogen atom or an alkyl group containing 1 to 10 carbon atoms, or R$_{13}$ and R$_{14}$, taken together, may form a 5- or 6-membered heterocyclic ring together with the nitrogen atom to which they are bonded, which heterocyclic ring may optionally contain 1 to 2 hetero atoms selected from oxygen, sulfur and nitrogen atoms; R$_{15}$ represents a lower alkylene group; R$_{16}$ represents a hydrogen atom or a lower alkyl group; R$_{17}$ and R$_{18}$, independently from each other, represent a substituted or unsubstituted alkyl group containing 1 to 5 carbon atoms; Q represents an oxygen or sulfur atom; and X$^\ominus$ represents an inorganic or organic anion.

17. The membrane of claim 12 wherein said compound containing one or two ethylenically unsaturated bonds is (a$_2$) a compound of the formula

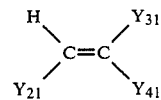

wherein Y$_{21}$ represents a hydrogen atom or a carboxyl group; Y$_{31}$ represents a hydrogen atom or a methyl group; Y$_{41}$ represents a cyano group, a carboxyl group, a sulfo group, a sulfonate group, a 2-oxopyrrolidinyl group, a glycidyl oxymethyl group, or a group of the formula —COOR$_{301}$, —OCOR$_{301}$, —COR$_{301}$ or

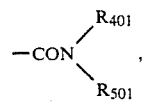

in which $R_{301}$ represents a lower alkyl group, a hydroxy loweralkyl group, a 2-hydroxy-3-halopropyl group or a glycidyl group, $R_{401}$ and $R_{501}$, independently from each other, represent a hydrogen atom, a lower alkyl group or a hydroxy lower-alkyl group, or when taken together, may form a pyrrolidine, piperidine, piperazine, morpholine or thiomorpholine ring together with the nitrogen atom to which they are bonded; and $Y_{21}$ and $Y_{41}$ together may represent a group of the formula

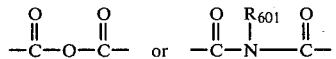

in which $R_{601}$ represents a lower alkyl group, or $Y_{21}$, and $Y_{41}$ together may form a cyclooctadiene or norbornene ring together with the carbon-carbon double bond to which they are bonded; or (b₂) a compound of the formula

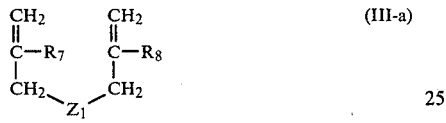

wherein $R_7$ and $R_8$ each represent a hydrogen atom or a methyl group; $Z_1$ represents a group of the formula

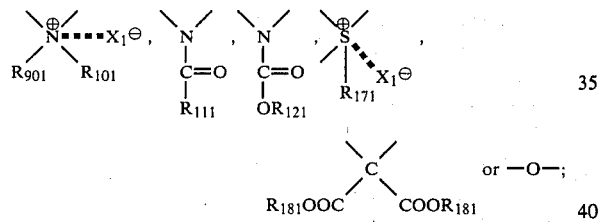

$R_{901}$ and $R_{101}$, independently from each other, represent a hydrogen atom, a lower alkyl group, a carboxy loweralkyl group, a hydroxy lower-alkyl group, a cyano loweralkyl group, a sulfo lower-alkyl group, a 2-hydroxy-3-halopropyl group, an allyl group, a cyclohexyl group, a phenyl group or a benzyl group, or $R_{901}$ and $R_{101}$, when taken together, may form a pyrrolidine, piperidine, piperazine, morpholine or thiomorpholine ring together with the nitrogen atom to which they are bonded; $R_{111}$ represents a hydrogen atom, a lower alkyl group, a halo lower-alkyl group, a hydroxy lower-alkyl group, a phenyl group, a benzyl group, or a group of the formula

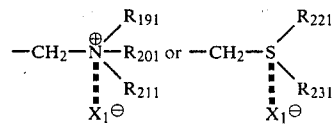

in which $R_{191}$, $R_{201}$ and $R_{211}$, independently from each other, represent a hydrogen atom, a lower alkyl group, a hydroxy lower-alkyl group or a benzyl group, or two of $R_{191}$, $R_{201}$ and $R_{211}$ may form a pyrrolidine, piperidine, piperazine, morpholine or thiomorpholine ring together with the nitrogen atom to which they are bonded, or $R_{191}$, $R_{201}$ and $R_{211}$ together may form a pyridine ring together with the nitrogen atom to which they are bonded, said pyridine ring optionally being substituted with a methyl, carboxyl or carbamoyl group, and $R_{221}$ and $R_{231}$, independently from each other, represent a lower alkyl group or a hydroxy lower-alkyl group; $R_{121}$ represents a lower alkyl group, a phenyl group or a benzyl group; $R_{171}$ and $R_{181}$ each represent a lower alkyl group or a hydroxy lower-alkyl group; and $X_1^-$ represents a halogen ion, bi-sulfate ion, nitrate ion or carboxylate ion.

18. The membrane of claim 12 wherein the compound containing one or two ethylenically unsaturated bonds is (a₃) a compound of the formula

wherein $Y_{31}$ represents a hydrogen atom or a methyl group; $Y_{411}$ represents a 2-oxopyrrolidinyl group, a lower alkoxycarbonyl group, a lower alkanoyloxy group, a carbamoyl group, or a mono- or di-lower alkyl carbamoyl group; or (b₃) a compound of the formula

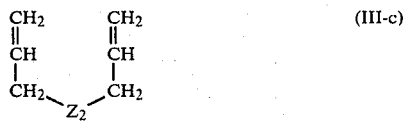

wherein $Z_2$ represents a group of the formula

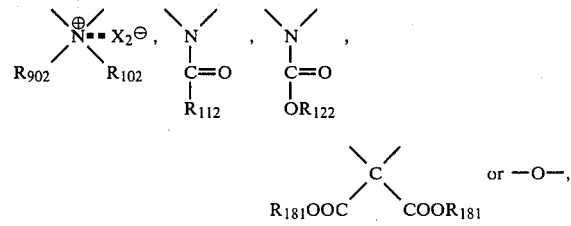

in which $R_{902}$ and $R_{102}$, independently from each other, represent a hydrogen atom or a lower alkyl group, each of $R_{112}$, $R_{122}$ and $R_{181}$ represents a lower alkyl group; and $X_2^\ominus$ represents $Cl^\ominus$, $Br^\ominus$, $I^\ominus$, $NO_3^\ominus$, $HSO_4^\ominus$, $HCOO^\ominus$, or $CH_3COO^\ominus$.

19. A semipermeable composite membrane comprising a microporous substrate and a thin semipermeable film of a polymeric material deposited on one side of the substrate, said thin semipermeable film being prepared by interfacial crosslinking of a copolymer composed of (A₁) at least 50 mole % of a recurring unit of the formula

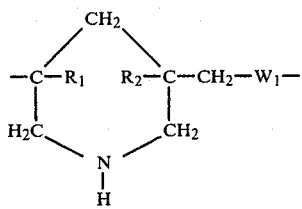 (I)

wherein each of $R_1$ and $R_2$ represents a hydrogen atom or a methyl group, and $W_1$ represents a direct bonding or a sulfonyl group (—$SO_2$—), and (B$_1$) up to 50 mole % of at least one recurring unit selected from $$-\overset{Y_1}{\underset{Y_2}{\overset{|}{\underset{|}{C}}}}-\overset{Y_3}{\underset{Y_4}{\overset{|}{\underset{|}{C}}}}-W_2- \text{; and} \quad (IV)$$

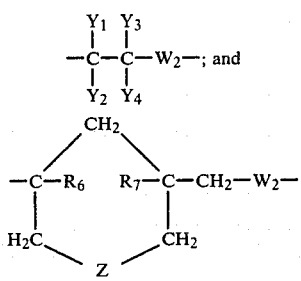 (V)

wherein $Y_1$, $Y_2$, $Y_3$, $Y_4$, $R_6$, $R_7$ and Z are as defined in claim 16, and $W_2$ represents a direct bonding or sulfonyl (—$SO_2$—), with a polyfunctional compound containing at least two functional groups selected from acid halide, sulfonyl halide, isocyanate, N-haloformyl, haloformate and acid anhydride groups.

20. A semipermeable composite membrane comprising a microporous substrate and a thin semipermeable film of a polymeric material deposited on one side of the substrate, said thin semipermeable film being prepared by interfacial crosslinking of a copolymer composed of (A$_2$) 60 to 95 mole % of a recurring unit of the formula

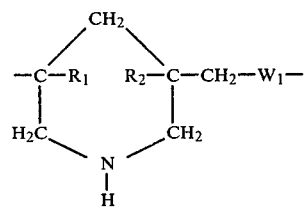 (I)

wherein each of $R_1$ and $R_2$ represents a hydrogen atom or a methyl group, and $W_1$ represents a direct bonding or a sulfonyl group (—$SO_2$—), and (B$_2$) 5 to 40 mole % of at least one recurring unit selected from

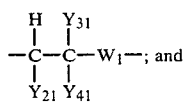 (IV-a)

-continued

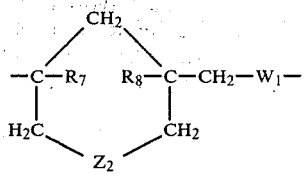 (V-a)

wherein $Y_{21}$, $Y_{31}$, $Y_{41}$, $R_7$ and $R_8$ are as defined in claim 17, $W_1$ is as defined above, and $Z_2$ represents a group of the formula

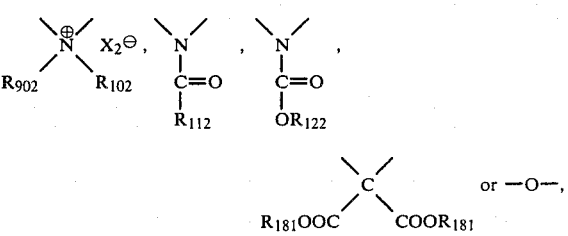

in which $R_{902}$ and $R_{102}$, independently from each other, represent a hydrogen atom or a lower alkyl group, each of $R_{112}$, $R_{122}$ and $R_{181}$ represents a lower alkyl group; and $X_2^{\ominus}$ represents $Cl^{\ominus}$, $Br^{\ominus}$, $I^{\ominus}$, $NO_3^{\ominus}$, $HSO_4^{\ominus}$, $HCOO^{\ominus}$, or $CH_3COO^{\ominus}$, with a polyfunctional compound containing at least two functional groups selected from acid halide, sulfonyl halide, isocyanate, N-haloformyl, haloformate and acid anhydride groups.

21. A semipermeable composite membrane comprising a microporous substrate and a thin semipermeable film of a polymeric material deposited on one side of the substrate, said thin semipermeable film being prepared by interfacial cross-linking of a copolymer composed of (A$_3$) 70 to 85 mole % of a recurring unit of the formula

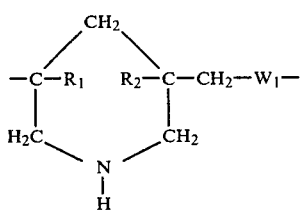 (I)

wherein each of $R_1$ and $R_2$ represents a hydrogen atom or a methyl group, and $W_1$ represents a direct bonding or a sulfonyl group (—$SO_2$—), and (B$_3$) 30 to 15 mole % of at least one recurring unit selected from

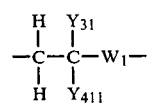 (IV-b)

and

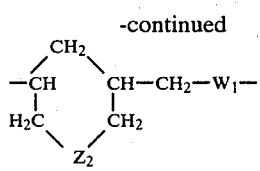
(V-b)

wherein $Y_{31}$, $Y_{411}$ and $Z_2$ are as defined in claim 18, and $W_1$ is as defined above, with a polyfunctional compound containing at least two functional groups selected from acid halide, sulfonyl halide, isocyanate, N-haloformyl, haloformate and acid anhydride groups.

22. The membrane of claim 1 wherein said polymer has blended therewith a basic compound soluble in water or in a lower alcohol.

23. The membrane of claim 22 wherein said basic compound has a solubility of at least 0.1 g at 25° C. in 100 g of water or the lower alcohol.

24. The membrane of claim 22 wherein said basic compound is an organic compound which has a pka value of 5 to 13.

25. The membrane of claim 22 wherein said basic compound is a polyimino compound containing at least 2 imino groups and having a molecular weight of 86 to 500.

26. The membrane of claim 25 wherein said polyimino compound is a compound expressed by the following formula

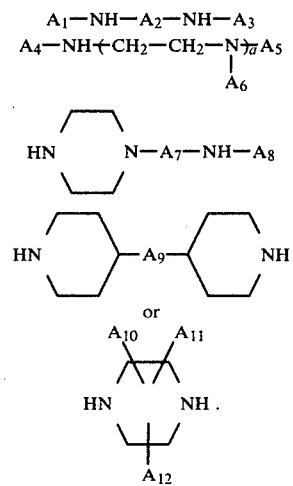

wherein $A_1$ and $A_3$, independently from each other, represent a lower alkyl group; $A_2$ represents an alkylene group having 1 to 10 carbon atoms which may contain an ether linkage; $A_4$ and $A_5$, independently from each other, represent a lower alkyl group optionally substituted with a cyano, hydroxyl or lower alkoxycarbonyl group; $A_6$ represents a hydrogen atom or a group of the formula —CH$_2$—CH$_2$—NH—$A_4$; $A_7$ represents a lower alkylene group; $A_8$ represents a lower alkyl group optionally substituted with a cyano, hydroxyl or lower alkoxycarbonyl group; $A_9$ represents a lower alkylene group; at least one of $A_{10}$, $A_{11}$ and $A_{12}$ represents a lower alkyl group, and the remainder represent a hydrogen atom; and a is an integer of 1 to 10.

27. The membrane of claim 22 wherein the amount of said basic compound is at least 0.5 moles per equivalent of the imino groups in said polymer.

28. The membrane of claim 22 wherein the amount of said basic compound is 0.7 to 3.0 moles per equivalent of the imino groups in said polymer.

29. The membrane of claim 1 wherein the polyfunctional compound is an aromatic, heterocyclic or alicyclic compound.

30. The membrane of claim 1 wherein the polyfunctional compound is an aromatic compound.

31. The membrane of claim 1 wherein the polyfunctional compound is a di- or tri-functional aromatic compound containing two or three functional groups selected from acid halide, sulfonyl halide and acid anhydride groups.

32. The membrane of claim 1 wherein the polyfunctional compound is a difunctional aromatic compound containing two isocyanate groups.

33. The membrane of claim 1 wherein the polyfunctional compound is a trifunctional aromatic compound, or a mixture of a difunctional aromatic compound and a trifunctional aromatic compound.

34. The membrane of claim 31 wherein the di- or tri-functional aromatic compound is isophthaloyl chloride, terephthaloyl chloride, trimesoyl chloride or 3-chlorosulfonylisophthaloyl chloride.

35. The membrane of claim 1 wherein said thin semipermeable film has a thickness of at least about 100 Å.

36. The membrane of claim 1 wherein said microporous substrate is composed of an aromatic polysulfone.

37. The membrane of claim 1 wherein said microporous substrate is composed of an asymmetrical membrane of an aromatic polysulfone.

38. A process for producing a semipermeable composite membrane which comprises
(a) treating a microporous substrate with a solution containing a polymer containing a recurring unit of the formula

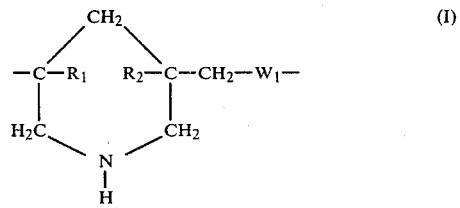

wherein each of $R_1$ and $R_2$ represents a hydrogen atom or a methyl group, and $W_1$ represents a direct bonding of a sulfonyl group (—SO$_2$), (b) contacting the treated microporous substrate interfacially with a solution of a polyfunctional compound selected from aromatic, heterocyclic and cyclic compounds containing at least two functional groups selected from the class consisting of acid halide, sulfonyl halide, isocyanate, N-haloformyl, haloformate and acid anhydride groups, and (c) optionally heating them to form a thin film of the crosslinked polymer having semipermeability on one side of the microporous substrate.

39. The process of claim 38 wherein said polymer is formed by contacting the corresponding polymer precursor containing a recurring unit of the formula

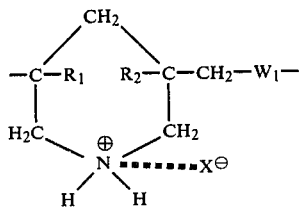

(XVI)

wherein $R_1$, $R_2$ and $W_1$ are as defined in claim 38, and $X^{\ominus}$ represents an inorganic or organic anion, with a basic compound on the microporous substrate.

40. The process of claim 38 wherein the resulting composite membrane is coated with a water-soluble organic polymer.

41. The process of claim 40 wherein the water-soluble organic polymer is polyvinyl alcohol, polyvinyl pyrrolidone or polyvinyl methyl ether.

42. In a method for desalination of saline or brackish water by reverse osmosis comprising contacting the saline or brackish water under pressure with a reverse osmosis membrane, the improvement wherein the membrane of claim 1 is used as the reverse osmosis membrane.

* * * * *